(12) United States Patent
Van Den Nieuwelaar et al.

(10) Patent No.: US 7,232,366 B2
(45) Date of Patent: Jun. 19, 2007

(54) METHOD AND DEVICE FOR PROCESSING A CARCASS PART OF A SLAUGHTERED POULTRY

(75) Inventors: Adrianus Josephes Van Den Nieuwelaar, Gemert (NL); Petrus Christianus Marius Janssen, Wilbertoord (NL); Gerardus Johannes Catharina van Bussel, Neerkant (NL)

(73) Assignee: Stork PMT B.V., AV Boxmeer (NL)

( * ) Notice: Subject to any disclaimer, the term of this patent is extended or adjusted under 35 U.S.C. 154(b) by 0 days.

(21) Appl. No.: 11/292,142

(22) Filed: Dec. 1, 2005

(65) Prior Publication Data

US 2006/0099900 A1     May 11, 2006

Related U.S. Application Data

(63) Continuation of application No. 10/741,282, filed on Dec. 19, 2003, now Pat. No. 6,986,707.

(30) Foreign Application Priority Data

Dec. 20, 2002    (NL)  ................................ 1022236
Jan. 17, 2003    (NL)  ................................ 1022418

(51) Int. Cl.
     *A22C 21/00*        (2006.01)
(52) U.S. Cl. ..................................................... 452/187
(58) Field of Classification Search ................ 452/125, 452/127–130
See application file for complete search history.

(56) References Cited

U.S. PATENT DOCUMENTS 4,385,419 A    5/1983   Cantrell
4,683,616 A    8/1987   Tieleman
5,269,722 A *   12/1993   Diesing et al. .............. 452/135
5,312,291 A    5/1994   van den Nieuwelaar et al.
5,545,083 A    8/1996   Bargele et al.
5,827,116 A    10/1998   Al et al.
5,913,720 A    6/1999   Scott et al.
5,938,517 A    8/1999   Vineyard et al.

(Continued)

FOREIGN PATENT DOCUMENTS

DE          195 25 154 A1     1/1997

(Continued)

*Primary Examiner*—Thomas Price
(74) *Attorney, Agent, or Firm*—Kilpatrick Stockton LLP

(57) ABSTRACT

The invention relates to a method and a device for processing a carcass part of slaughtered poultry, which carcass part comprises at least part of a rib cage, meat which is naturally present on said rib cage, a neck opening, and a wing joint, the carcass part having an interior which method comprises the following steps:

Figure 1:
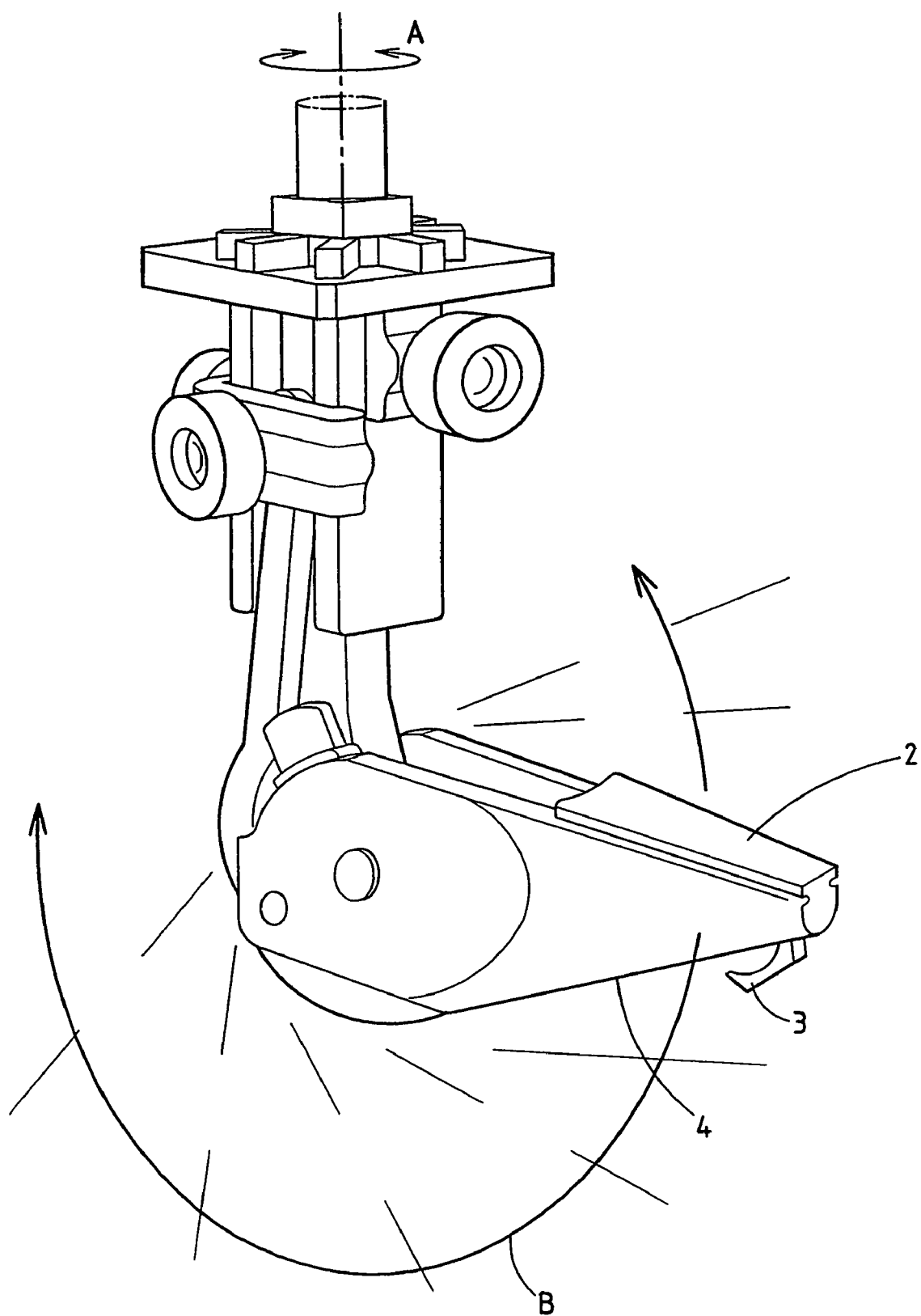

applying and fixing the carcass part to a product carrier, which product carrier is moveable and which product carrier engages the interior of the carcass part, moving a wing-joint positioning member via said neck opening into the interior of the carcass part, the wing-joint positioning member being provided with one or more wing-joint positioning surfaces, which are arranged in such a manner that, in a defined position of the first wishbone blade with respect to the carcass part, the wing-joint positioning surfaces hold said wing joint into a predetermined position, exerting an internal pressure on the carcass part, in such a manner that said one wing joint is supported in the predetermined position by a wing-joint positioning surface of the first wishbone blade.

16 Claims, 23 Drawing Sheets

U.S. PATENT DOCUMENTS

| | | | |
|---|---|---|---|
| 6,007,416 A * | 12/1999 | Janssen et al. | 452/135 |
| 6,033,296 A | 3/2000 | Herman Winkelmolen | |
| 6,220,953 B1 * | 4/2001 | Cornelissen et al. | 452/182 |
| 6,248,012 B1 * | 6/2001 | Folkmann | 452/135 |
| 6,450,873 B2 | 9/2002 | van der Steen et al. | |
| 6,736,717 B1 * | 5/2004 | Annema et al. | 452/172 |
| 6,986,707 B2 | 1/2006 | Van Den Nieuwelaar et al. | |
| 2002/0102933 A1 | 8/2002 | Hetterscheid et al. | |
| 2004/0132395 A1 | 7/2004 | van den Nieuwelaar et al. | |

FOREIGN PATENT DOCUMENTS

| | | |
|---|---|---|
| DE | 195 25 154 C2 | 1/1997 |
| EP | 0 336 162 B1 | 6/1993 |
| EP | 0 551 156 | 7/1993 |
| EP | 0 695 506 A2 | 2/1996 |
| EP | 0 695 506 A3 | 2/1996 |
| EP | 0 695 506 B1 | 2/1996 |
| EP | 0 765 603 B1 | 4/1997 |
| NL | 1 002 831 C | 10/1997 |
| NL | 1 014 845 | 12/2000 |
| NL | 1 022 236 | 6/2004 |
| WO | WO 01/03509 A1 | 1/2001 |

* cited by examiner

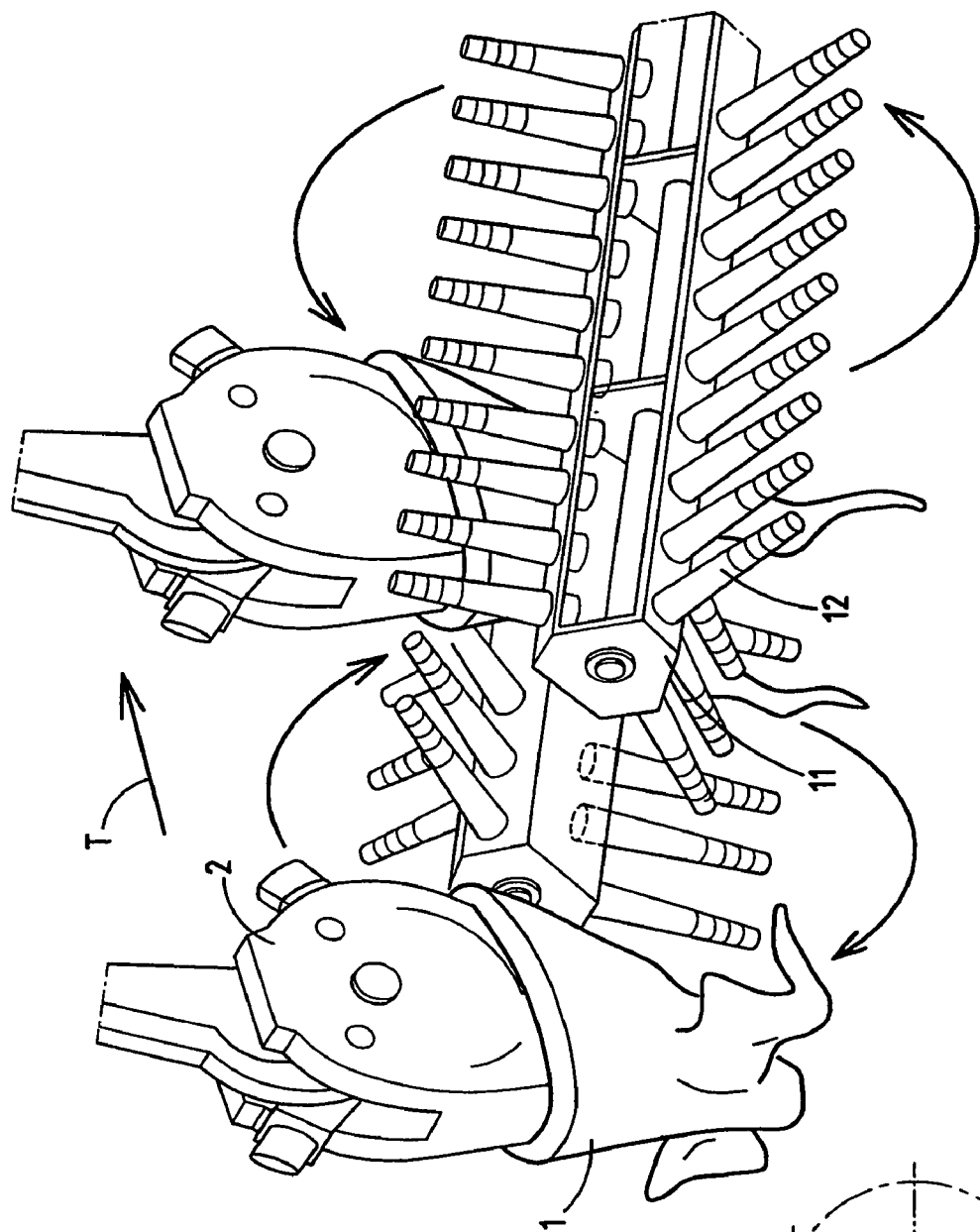
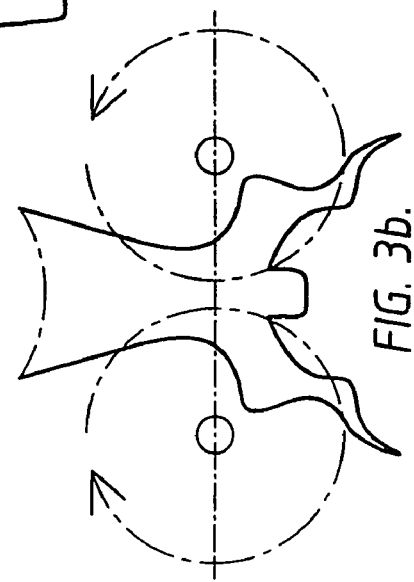
FIG. 3a.
FIG. 3b.

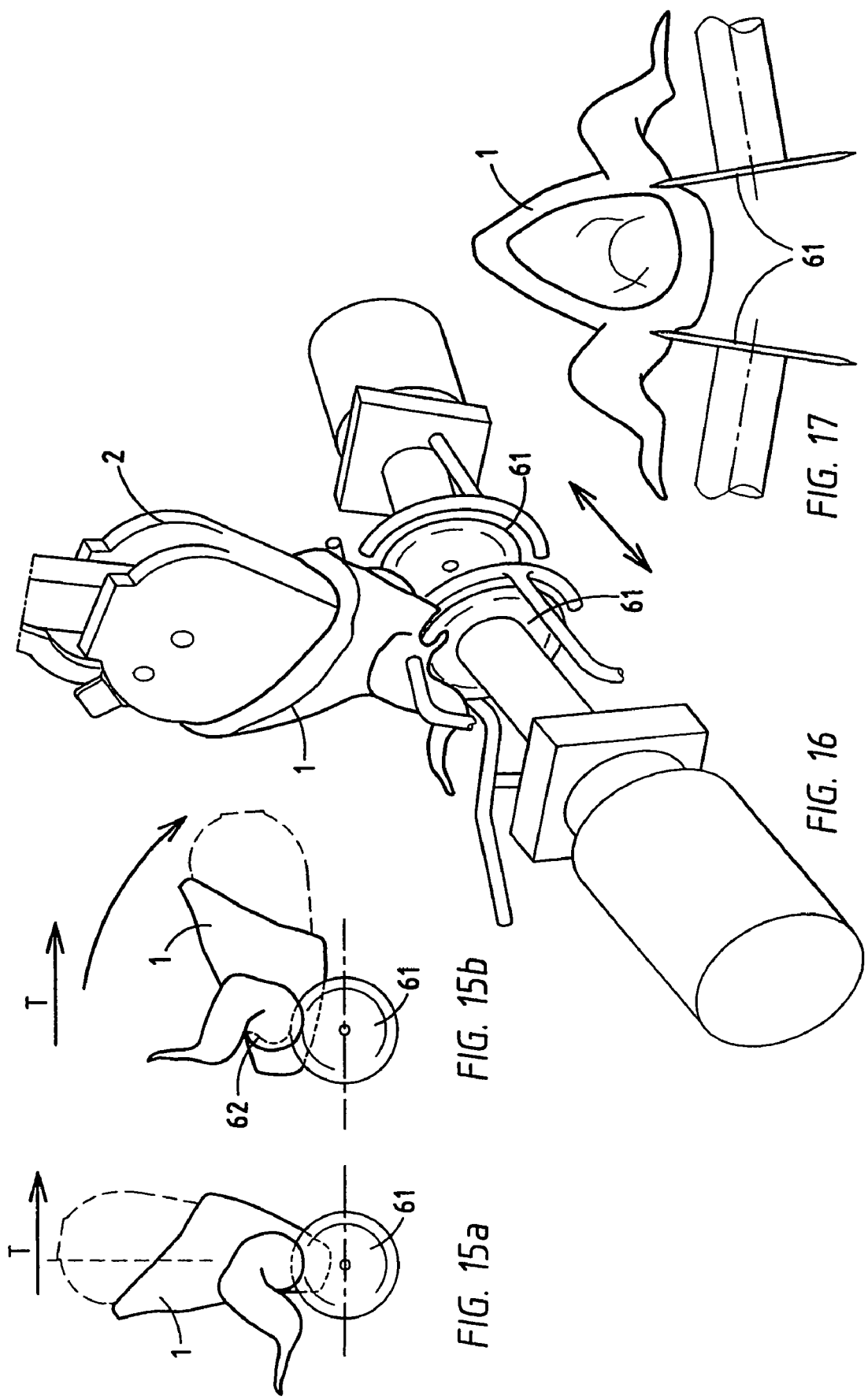

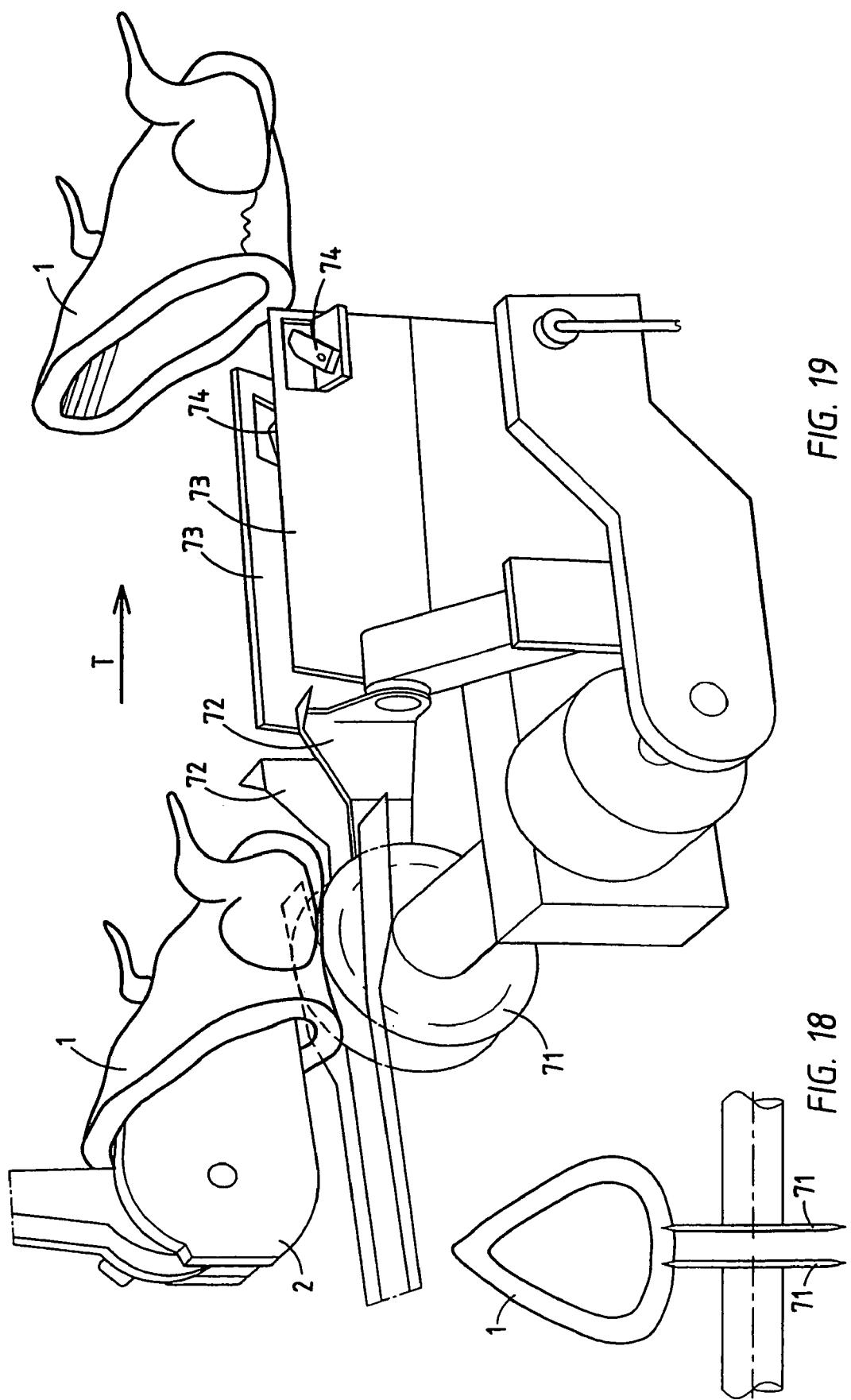

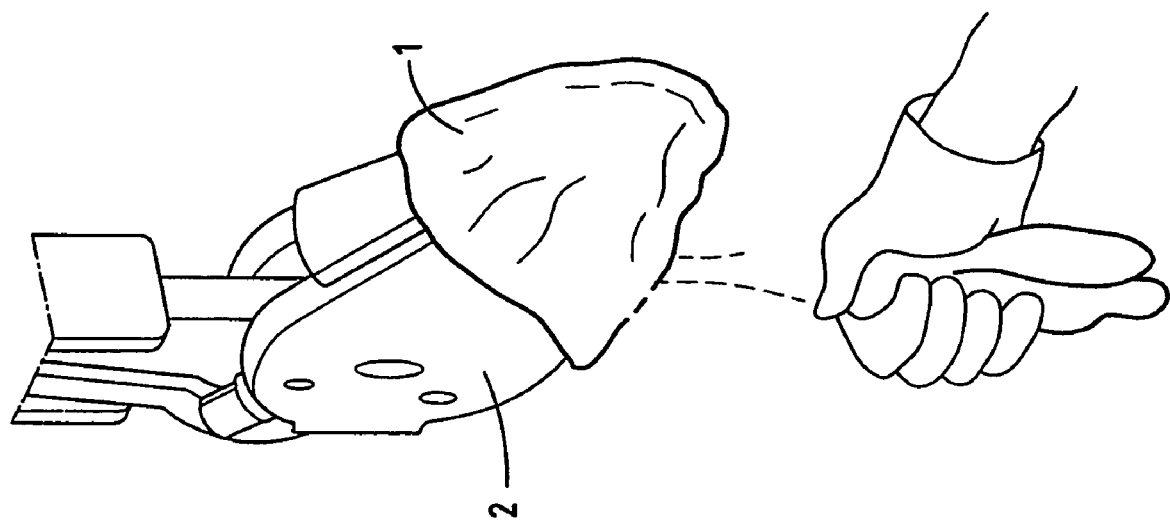
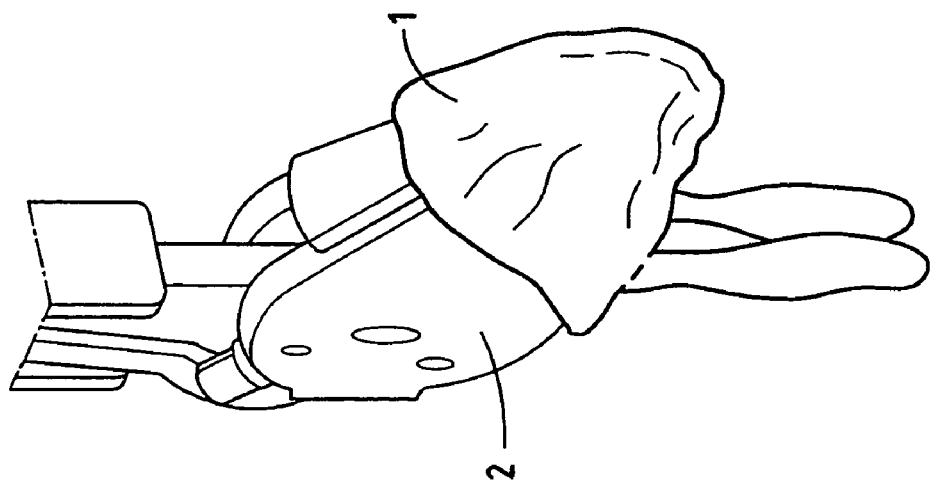
FIG. 24

METHOD AND DEVICE FOR PROCESSING A CARCASS PART OF A SLAUGHTERED POULTRY

RELATED APPLICATION DATA

This application is a continuation of U.S. patent application Ser. No. 10/741,282 filed Dec. 19, 2003 U.S. Pat. No. 6,986,707 which claims the benefit of Netherlands Patent Application No. 1022418 filed Jan. 17, 2003 and Netherlands Patent Application No. 1022236 filed Dec. 20, 2002.

BACKGROUND OF THE INVENTION

The invention relates to methods and devices for processing a carcass part of slaughtered poultry, which carcass part comprises at least part of the ribs and part of the meat which is naturally present thereon.

The modern consumer of meat products derived from poultry, in particular from chicken, has become used to a wide range of choices between a large number of high-grade products, such as inner fillets, outer fillets (single, double), drumsticks, legs and wings which have been cut in various ways. To enable consumer demand to be satisfied, processors of slaughtered poultry need a flexible method and device for processing a carcass part of slaughtered poultry which allows consumer demand for high-quality products to be efficiently satisfied.

For slaughtered poultry to be divided into parts which are attractive to the consumer, it is traditional for the poultry to be supplied to a dividing line. In this line, the poultry is hung by its legs from a suitable hook of a conveyor system which is guided past a number of processing stations.

A known dividing line generally comprises a station in which the front half of the carcass (comprising the breast and that part of the back which directly adjoins it) and the back half of the carcass (which comprises the legs and that part of the back which connects the legs) are separated from one another. The back half of the carcass is processed further in the dividing line still hanging by its legs, while the front halves are transferred to a separate filleting line to be processed further.

Traditionally, the neck and the neck skin are separated from the carcass while it is still in the dividing line. Where the wings are removed from the carcass part depends on how the breast meat is harvested. If the breast meat is scraped off the carcass part, the wings are removed in the dividing line. In another method used to harvest breast meat, force is exerted on the wings in order to pull the breast meat off the carcass part. The wings are then cut or pulled off the breast meat. With this method, wings and breast meat are therefore separated from one another in the filleting line.

With a view to efficiency and flexibility, it is desirable for it to be possible for processing operations such as wing cutting (in its different variants) and the removal of the neck and/or neck skin also to be carried out in the filleting line.

NL-1014845 describes a device for processing a slaughtered poultry product which comprises product carriers which are secured to an overhead conveyor. This known device for processing a slaughter product comprises a conveyor which can move along a path and to which a first body, which can rotate about a first axis, is connected. A second body, which can rotate about a second axis, is connected to the first body. A first actuating device sets various first angular positions of the first body with respect to the first axis, while a second actuating device sets various second angular positions of the second body with respect to the second axis. A locking device fixes the first and/or second angular position. The locking device is actuated by actuating cams situated near the second axis. The actuating cams can be operated in different angular positions of the first body and the second body. A slaughter product fixing device connects a breast portion of the slaughter product to the second body. The description of NL 1014845 is incorporated by reference herein.

Both front halves and breast caps, with or without wings, parts of wings, the neck, the neck skin and/or the backbone, can be applied to a product carrier of this type. This known product carrier guides the carcass part fixed to it past a number of processing stations, it also being possible for the carcass part to be moved into a position with respect to each of the processing stations as if the carcass part were to be hanging from a hook belonging to a dividing line. This way, the product carrier can be regarded as a prothesis for the back half while the carcass part is transported, as the product carrier of the type of NL-1014845 takes over the function of the back half in traditional dividing lines. This has the advantage that processing devices which could previously only form part of the dividing line can now also be integrated into the filleting line.

In practice, it has been found that the possibility of carrying out operations which hitherto had to be carried out in the dividing line, or which it was at least greatly preferred to carry out in the dividing line, in the filleting line offers possibilities with a view to optimizing the processing of a carcass part which comprises at least part of the ribs and part of the meat which is naturally present thereon.

However, not all the optimizations which have been developed require the use of a product carrier as described in NL 1014845. Even simpler product carriers, for example product carriers which can only be pivoted in a single plane, may be adequate. In addition, it is also the case that methods and devices according to the invention can be used without being expressly combined with a product carrier which is moving along a path. In this context, consideration can be given, for example, to their use in a stand-alone machine or a device in which the product which is to be processed is moved past the device by hand. Any optimization which has been developed may be applied as such, possibly in combination with a prior art method or device. It is also envisaged that two or more optimizations are combined.

The object of the invention is to make use of the possibilities for optimizing the processing of a carcass part of slaughtered poultry. This allows high production speeds, a high yield and a high quality of the products to be achieved. There is also a greater degree of flexibility with regard to the shape, dimensions and weight of the carcass part which is to be processed, as well as more flexibility in terms of the end product which can be achieved.

In a first aspect of the invention, this object is achieved by a method for processing a carcass part of slaughtered poultry, which carcass part comprises at least part of a rib cage, meat which is naturally present on said rib cage, a neck opening, and a wing joint, the carcass part having an interior, which method comprises the following steps:

applying and fixing the carcass part to a product carrier, which product carrier is moveable and which product carrier engages the interior of the carcass part, moving a wing-joint positioning member via said neck opening into the interior of the carcass part, the wing-joint positioning member being provided with one or more wing-joint positioning surfaces, which are arranged in such a manner that, in a defined position of the first wishbone blade with respect to the carcass part, the wing-joint positioning surfaces hold said wing joint into a predetermined position, exerting an internal pressure on the carcass part, in such a manner that said one wing joint is supported in the predetermined position by a wing-joint positioning surface of the first wishbone blade.

The method for positioning the wing joints can successfully be applied to carcass parts without a wishbone. In cases in which the wishbone is present but does not have to be cut loose, the wing-joint positioning member is also suitable for use. In those cases, the wing-joint positioning member functions as a support for the wing-joint positioning surfaces. The use of a wing-joint positioning member positions the wing-joint reliably and reproducably to enable accurate processing of the wing joint, such as the formation of an incision through the wing-joint without damaging the bones of the joint in the process.

However, in many cases, a wishbone or part of a wishbone has to be removed or at least cut loose from the carcass part. To cut the fragile wishbone loose from the carcass part, the wing-joint positioning member is in those cases preferably provided with a suitable cutting edge. It has been found that the operation of cutting loose the wishbone (or a part of the wishbone) can be successfully combined with an accurate processing operation of the wing joint, such as the formation of an incision through the wing joint without damaging the bones of the joint in the process when such a wing-joint positioning member with a suitable cutting edge is applied.

Before being processed, the carcass part which is to be processed is applied and fixed to a product carrier. The product carrier which is known from NL 1014845 is particularly suitable for this purpose. This product carrier moves the carcass part which is to be processed into the correct orientation with respect to a first processing device. Accurate processing of the wing joint is carried out in this first processing device, and if appropriate the wishbone or that part of the wishbone which is present is cut loose and if appropriate removed from the carcass part.

The wing-joint positioning member is moved into the carcass part via the neck opening. If products with a neck or neck skin are being processed, it is advantageous first of all to move the neck and/or neck skin away from the neck opening, so that it is successfully cleared and the wing-joint positioning member can be introduced into the interior of the carcass without problems. One or more wing-joint positioning surfaces are arranged on the wing-joint positioning member. When the wing-joint positioning member is being displaced into position with respect to the carcass part, the one or more positioning surfaces act to move the wing-joint substantially into a predetermined position, for example by pushing the wing-joint slightly outwards. In this way, the overall positioning of the wing-joint is realized from interior of the carcass.

To realize accurate positioning of a wing joint, after the wing joint has been moved into position from the interior of the carcass part, an external pressure is exerted on the carcass part by pressure-exerting means. These pressure-exerting means ensure that the wing joint comes to bear firmly against said wing-joint positioning surface, in such a manner that it reliably comes to lie in the predetermined position.

The combination of positioning the wing joints from the interior and from the outside of the carcass part has the advantage that the position of the wing joints with respect to the processing device is reliably, accurately and unambiguously defined, and also that the position of the wing joint with respect to the processing device is largely independent of the size, weight and shape of the carcass part to be processed.

In the case of a relatively small or medium-sized, ideally shaped carcass part, in which each wing joint is located at a relatively short distance from the location of the backbone, each wing joint will be pushed outwards, towards the predetermined position, by a wing-joint positioning surface. In these cases, the wing joint will already bear firmly against a wing-joint positioning surface and will adopt the position which is prescribed by this surface. In these cases, pressing on the carcass part from the outside primarily constitutes an additional guarantee that the wing joint will retain its ideal position with a sufficient accuracy during a processing operation.

In the case of a relatively large or less ideally shaped carcass part, there is no guarantee that a wing joint will immediately be positioned as intended by acting on it from the inside of the carcass part by a wing-joint positioning surface of the wing-joint positioning member. In such cases, the wing joint will not always immediately bear correctly against the associated wing-joint positioning surface. The wing-joint positioning surface is then merely responsible for overall preliminary positioning of the wing joint. The pressure-exerting means then apply a preferably targeted pressure to the carcass part from the outside, with the result that each wing joint still comes to bear correctly against its associated wing-joint positioning surface, so the wing joints reach the predetermined position with a high degree of accuracy.

Since the position of the wing joints is thus accurately known and largely independent of the size and shape of the carcass part, it is possible for processing operations on the wing joints to be carried out accurately.

One example of such a processing operation is that of cutting through some of the connecting tendons between a wing (or wing part) and the other parts of the carcass part, in such a manner that at least one connecting tendon between an outer fillet and a wing or wing part remains intact. The operation of reliably and reproducibly cutting through the wing joint at least largely without damaging the bones of the joint is another example of such a processing operation which is possible on account of accurate positioning of the wing joint.

These two processing operations can be combined by the use of special wing-cutting blades which are substantially sickle-shaped. These blades are provided with a facet which prevents the tendons from slipping off the wing-cutting blade during the cutting operation.

To make a wing joint incision of this nature, the sickle-shaped wing-cutting blades are preferably rotated or moved in some other way such that they come to lie around the wing joint. During the rotary motion, the meat and tissue around the wing joint is already being cut into. Then, the wing-cutting blades are moved further, with the result that the wing-cutting blades are pulled further through the joint. During this further movement, each wing-cutting blade at a given moment comes into contact with the tendon located inside of the joint. The continuing movement severs the tendons, with the facet of the wing-cutting blade preventing the tendon from sliding off the wing-cutting blade.

Control means of the wing-cutting blades are preferably adapted to allow to determine whether or not the wing-cutting blades execute the wing joint incision for each passing product.

In a preferred embodiment in which the wing cutting is carried out using the special wing-cutting blades mentioned above and a connecting tendon between the outer fillet and wing (part) remains intact, it is possible to harvest both the breast fillet, the eye meat, the second fillet and the inner fillets in an advantageous way.

It is in this way possible to carry out the method of harvesting second fillets as described in EP 0 695 506.

The invention also relates to a device for carrying out the method according to the first aspect of the invention. It is preferable for a plurality of these devices to be accommodated in a turret machine. The devices can be positioned either substantially horizontally or substantially vertically in a turret machine of this type.

The second aspect of the invention relates to an optimization of the processing of a carcass part of slaughtered poultry, which carcass part comprises at least part of a rib cage, meat which is naturally present on said rib cage, a neck opening and part of the wishbone, which method comprises the following steps:

applying and fixing the carcass part to a product carrier, which product carrier is moveable along a path and which product carrier engages on the inside of the carcass part, moving a block into the carcass part through the neck opening of the carcass part, which block has a recess for receiving the wishbone or that part of it which is present, and which block is arranged between the two limbs of the wishbone or between the locations at which these limbs would be located if the entire wishbone were present, cutting the wishbone or that part of it which is present loose from the carcass part on the side facing the back side of the carcass part by introducing a first wishbone blade along one side of the block, the first wishbone blade having a cutting edge, the contour of which substantially corresponds to the outer contour of the complete wishbone, introducing two second wishbone blades into the carcass part on either side along the block, preferably substantially perpendicular to the first wishbone blade, the second wishbone blades substantially following the outer contour of the complete wishbone, and cutting the wishbone or that part of it which is present loose from the carcass part, in such a manner that the wishbone or that part of it which is present is enclosed between the block, the first wishbone blade and the second wishbone blades, pulling the block, the first wishbone blade and the second wishbone blades back out of the carcass path together, in such a manner that the wishbone or that part of it which is present remains enclosed between the block, the first wishbone blade and the second wishbone blades and is thereby removed from the carcass part.

After the processing operation has been carried out on the wing joints which are present, it is preferable for the wishbone or that part of the wishbone which is still present to be removed from the carcass part. According to a second aspect of the invention, this is achieved by moving a block into the carcass part between the two limbs of the wishbone before the first wishbone blade is introduced. If only part of the wishbone is still present, the block is introduced into the carcass part at a position which is such that if the entire wishbone were still present the block would be located between the two limbs of the wishbone. In the block there is a recess which receives the wishbone or that part of the wishbone which is still present. A block for receiving at least part of the wishbone is known from EP 0 336 162.

The first wishbone blade has a preferably flat cutting part. The shape of the outer contour of this cutting part substantially corresponds to the shape of the outer contour of the wishbone, i.e. the cutting part has a substantially triangular contour. The cutting part is provided with at least one cutting edge.

In an advantageous embodiment, the cutting part of the first wishbone blade is substantially triangular in shape, with the wide side of the triangle being wider than the wishbone. As a result, not only the wishbone but also the surrounding meat is cut loose from the carcass part. This is not only of benefit to the amount of meat recovered but also ensures that this additional meat is in reality also harvested.

In a preferred embodiment, the wide side of the triangular shape of the first wishbone blade is so wide that the meat is cut loose from the carcass part as far as the immediate vicinity of the wing joint. As a result, the meat between the wishbone and the wing joint is also harvested, whereas previously it remained attached to the carcass part.

The first wishbone blade is arranged along one side of the block in the carcass part. As a result, the wishbone (or that part of the wishbone which is still present in the carcass part) is cut loose on the side facing the back side of the carcass part.

Then, two second wishbone blades are stabbed into the carcass part along the block on either side of it, substantially perpendicular to the first wishbone blade. These second wishbone blades substantially follow the outer contour of the wishbone and cut the wishbone loose from the carcass part.

When the block, the first wishbone blade and the second wishbone blades have been arranged in the carcass part, the wishbone is enclosed by them. The wishbone is removed from the carcass part by the block, the first wishbone blade and the second wishbone blades being pulled back simultaneously.

In an advantageous embodiment, when the block and the first and second wishbone blades are moved out of the carcass part, they move apart, and the wishbone is then removed from the block e.g. by the use of compressed air. Water can also be used as an alternative to compressed air, or alternatively mechanical means can be employed.

If products with a neck or neck skin are being processed, it is advantageous first of all to move the neck and/or neck skin away from the neck opening, so that the neck opening is successfully cleared and the first wishbone blade can be introduced in the carcass part without problems. More generally, preferably the neck opening is cleared before performing an operation on the wishbone or a part thereof which is present. Under "clearing of the neck opening" a removal of skin and/or crop fat and/or other tissue is to be understood.

In a further advantageous embodiment, the processing according to the second aspect of the invention is carried out in a turret machine. The production rate can be considerably increased in this way, since a plurality of products are processed simultaneously and continuously. In a traditional system, it is possible to process some 2300 products per hour, whereas with the method according to the invention the production rate is approximately 3000 products per hour or above, and when the method according to the invention is used in a turret machine it is possible to achieve production rates of 5000 products per hour.

In some areas, there is a demand for products in which the wishbone is still present, albeit partly cut free from the meat.

Products of this type can also be produced with the aid of the method and device according to the second aspect. In such a case, the first wishbone blade partly cuts loose the wishbone but the operation of introducing the second wishbone blades is omitted. Also, in this case the wishbone is not removed from the carcass part.

The invention also comprises a device for carrying out the method in accordance with the second aspect of the invention. It is preferable for a plurality of these devices to be accommodated in a turret machine. The devices can be positioned either substantially horizontally or substantially vertically in a turret machine of this type.

In a third aspect of the invention, the processing of a carcass part of slaughtered poultry, which carcass part comprises at least part of a rib cage which is naturally present thereon and part of the skin, the carcass part having an interior, is further optimized by a method which comprises the following steps:

applying and fixing the carcass part to a product carrier, which product carrier is moveable along a path and is preferably pivotable in a plurality of planes with respect to this path, and which product carrier is adapted to engage the interior of the carcass part, positioning the carcass part with respect to a first processing unit, removing the skin by moving the carcass part past at least two pairs of interacting, resiliently mounted skinning rolls, that part of the carcass part which is to be skinned being pressed onto the skinning rolls, in such a manner that the skinning rolls grip the skin which is to be removed and pull it off the carcass part, the positioning of the skinning rolls with respect to one another being matched to the contour of the carcass part.

WO 01/03509 has disclosed a device for removing skin from carcass parts in which use is made of a single pair of skinning rolls. The skinning rolls from the device which is known from WO 01/03509 have an additional degree of freedom, so that they can be positioned optimally with respect to the carcass part.

A drawback of the known device is its mechanical complexity resulting from the addition of the additional degree of freedom of the skinning rolls. This also makes the structure susceptible to faults.

The product carrier which is known from NL 1014845 is designed to change the position of the carcass part as it is being moved along the path. It is therefore possible to adapt the position of the carcass part as it moves past the skinning rolls. This means that the optimal position of the carcass part to be skinned can always be achieved.

To optimize the skinning of the carcass parts, two pairs of skinning rolls which are arranged resiliently are used in the method according to the third aspect of the invention. In addition, the skinning rolls adopt a position with respect to one another which is such that, as seen in the conveying direction of the carcass part, they substantially follow the contour of the carcass part (or at least a part of this carcass part) which is to be skinned.

As it moves past the skinning rolls, the carcass part is to some degree pressed against the resiliently mounted skinning rolls. As a result of the skinning rolls being arranged with respect to one another in such a manner that they substantially follow the contour of the carcass part, the pressure is substantially equally distributed over the entire periphery of the carcass part, which is of benefit to a gentle and flexible execution of the skinning process.

It is preferable for at least part of the skin which is to be removed to be tucked up to some extent before the carcass part is guided over the skinning rolls. The advantage of tucking up the skin is that the skinning rolls can obtain a better grip on the skin which is to be pulled off. This results in a much more reliable skinning process in particular in the case of dry and/or hung products.

If both back skin and breast skin is present on the carcass part, the breast skin is preferably removed before the back skin is removed. While processing a carcass part as such, mounted on any suitable carrier, on which carcass part both back skin and breast skin is present, a removal of the breast skin before a removal of the back skin is advantageously performed with skinning rolls, or a combination of scraping means and rolls, the rolls being oriented parallel to the longitudinal direction of the breastbone, or at right angles thereto.

The use of this principle can be applied to the skinning of all types of carcass parts (such as leg parts, back pieces, breast caps, etc.) and is expressly not restricted to the skinning of carcass parts of the type described above. It is also possible for rind-removal rolls, optionally in combination with scraper elements, to be used instead of the conventional skinning rolls.

The invention also relates to a device for carrying out the method in accordance with the third aspect of the invention.

According to a fourth aspect of the invention, the processing of a carcass part of slaughtered poultry, which carcass part comprises at least part of a rib cage, part of the meat which is naturally present on said rib cage, part of at least one of the wings and part of the back skin, the breast skin and the wing skin, the carcass part having an interior, is further optimized by a method which comprises the following steps:

applying and fixing the carcass part to a product carrier, which product carrier is moveable along a path in a conveying direction and is preferably pivotable in a plurality of planes with respect to this path, and which product carrier is preferably adapted to engage the interior of the carcass part, positioning the carcass part with respect to a first processing unit, making a first incision in the skin in the region of the connection between body and wing, on the breast side, in such a manner that the first incision on any carcass part is located at virtually the same position on the carcass part, irrespective of the size of the product, removing the breast skin by moving the carcass part past at least one pair of interacting skinning rolls, in such a manner that the skinning rolls grip the breast skin and pull it off the carcass part, the breast skin tearing off at the first incision which was made in the skin, with the result that the back skin and the wing skin remain connected to the carcass part, positioning the carcass part with respect to a second processing unit, with the carcass part located in a first orientation with respect to the conveying direction, cutting into the skin in the region of the connection between body and wing, on the side of the back, with the carcass part, during the cutting operation, being moved from the first orientation into a second orientation with respect to the conveying direction, so that a curved second incision is formed, removing the back skin by moving the carcass part past at least one pair of interacting skinning rolls, in such a manner that the skinning rolls grip the back skin and pull it off the carcass part, the back skin tearing off at the second incision between body and wing, with the result that a predetermined part of the wing skin remains connected to the carcass part.

In most cases, it is desirable for the products of the wings of the slaughtered poultry still to be provided with skin, while the products formed from the breast and/or back meat are preferably supplied in skinless form. Hitherto, this has been achieved by cutting into the skin on both the breast side and the back side at the transition between body and wing in the filleting line. In the known methods, this is carried out using fixedly disposed blades or by hand.

Then, the skin is pulled off the breast and back in the known methods by at least one pair of interacting skinning rolls. The incisions which have been made in the skin ensure that the skin tears off where the incisions are located.

Particularly in view of the variation in shape and size of the carcass parts to be processed, with the known methods it was not possible for the incisions to be formed in the skin of the carcass part at an accurate, reproducible, predetermined location. Consequently, the location at which the skin would tear was impossible to accurately predetermine.

However, this is possible with the fourth aspect of the invention. Firstly, the use of a product carrier which can be pivoted in a plurality of planes offers options for accurate positioning of the carcass part with respect to the blades which make the incisions.

Also the product carrier executes a movement while the second incision is being made. Consequently, the shape of the incision can deviate from the standard straight incision made by a static blade or from the slightly curved incision made by a rotating blade. This allows the shape of the incision to be optimized. Since the flexibility of the product carrier enables carcass parts which are to be processed to be positioned reproducibly with respect to the processing units, the incision is also made at the optimal position in the carcass part.

Preferably the depth of the incision made by the blades is adjusted with sufficient accuracy for only the skin to be cut into while the meat below is not touched. This applies to both the first incision and the second incision. Preferably, this is achieved by mounting a retaining device adjacent to the cutting means that prevents the cutting means from cutting to deep in the carcass part. In case of a the cutting means being a rotating knife, the retaining device is preferably a disc. This disc has on its side facing the rotating knife a diameter which is somewhat smaller than the diameter of the rotating knife. Further away from the rotating knife, the diameter of the disc is preferably the same as the diameter of the rotating knife.

In the method according to the fourth aspect of the invention, it not necessary to use a product carrier that engages the interior of the carcass part. It is also envisaged that carriers are used that engage the outside of the carcass part. It is envisaged that the transition from the first position to the second position can actuated by means that engage the carrier or by means that engage directly on the carcass part.

In a further advantageous embodiment, the breast meat is pushed away slightly from the region where the first incision is to be made before this first incision is actually made. The result of this is that the skin is taut at the corresponding location, so that the incision can be made more easily and more accurately. This also limits the risk of breast meat being touched when the incision in the skin is being made.

It is preferable for the carcass part, before it enters the second processing device, to be in an orientation with respect to the conveying direction in which the longitudinal axis of the carcass part is oriented substantially vertically and perpendicular to the conveying direction, and with its back side facing in the downstream direction. During cutting, the carcass part is preferably rotated into an orientation in which the longitudinal axis of the carcass part is positioned substantially horizontally, parallel to the conveying direction, and the neck opening of the carcass part faces upstream. As a result, it is possible for the second incision to run at least partially around the start of the wing.

It is preferable for at least part of the skin which is to be removed to be tucked up to some extent before the carcass part is guided over the skinning rolls. The advantage of tucking up the skin is that the skinning rolls acquire a better grip on the skin which is to be pulled off. This results in a much more reliable skinning process in particular in the case of dry and/or hung products.

The invention also relates to a device for carrying out the method according to the fourth aspect of the invention.

According to a fifth aspect of the invention, the processing of a carcass part of slaughtered poultry, which carcass part comprises at least part of a rib cage, which is naturally present on said rib cage on both the breast side and the back side, the carcass part having an interior, is further optimized by a method which comprises the following steps:

applying and fixing the carcass part to a product carrier, which product carrier is moveable along a path and is preferably pivotable in a plurality of planes with respect to this path, and which product carrier engages the interior of the carcass part, making two incisions in the meat on the back side of the carcass part, which incisions extend on either side of the backbone or the location in the carcass part where the backbone was located before being removed, and run substantially parallel thereto, loosening the back and shoulder meat from the bone parts of the body of the carcass part, in such a manner that a connection between the back and shoulder meat, on the one hand, and the breast meat—which is still connected to the bone parts of the body of the carcass part—on the other hand continues to exist, the back and shoulder meat being removed by the use of scraper means which initiate scraping from the incisions which have already been made on either side of the backbone, removing the breast meat from the bone parts of the body of the carcass part, in such a manner the breast, back and shoulder meat is all still joined together when it is removed in its entirety from the bone parts of the body of the carcass part.

Hitherto, the known methods have substantially harvested the breast meat as a fillet. The back and shoulder meat, which is much more difficult to remove, remained behind on the bone parts of the body of the carcass part and was often harvested later, in pieces, separately from the breast meat. Consequently, the back and shoulder meat had to be sold at a lower price than the breast meat, whereas its quality is equally good.

In addition, when the fillet is being pulled off using the method which has been known hitherto, meat often remains behind on the bone parts of the body of the carcass, while bone parts often come off with the meat which has been pulled off. The fifth aspect of the invention greatly improves this situation.

According to the fifth aspect of the invention, the back and shoulder meat is now harvested in such a manner that it remains connected to the breast meat, so that the entire unit comprising breast, back and shoulder meat can be sold as a fillet. It is preferable for the fifth aspect of the invention to be combined with a preferred embodiment of the second aspect of the invention, in which the eye meat is also harvested. This results in the formation of a large fillet which comprises breast meat, back meat, shoulder meat, eye meat and the second fillet.

To enable large fillets of this type to be harvested, first of all two long incisions are made in the back meat, substantially parallel to and on either side of the backbone. These incisions can be made, for example, using rotating blades. When making these incisions, it is preferable to prevent bone parts of the body of the carcass part from being touched by the blades.

Resiliently mounted scraper means are arranged on both sides of the carcass part. They start scraping during the cutting along the backbone as soon as the wing joints have passed the scraper means. While the carcass part is passing the scraper device, the resiliently mounted scraper means follow the contour of the carcass part and in this way detach the back and shoulder meat from the bone parts of the body of the carcass part. The connection between breast meat, on the one hand, and back and shoulder meat, on the other hand, is maintained.

In an advantageous embodiment in which at least the first aspect and the fifth aspect of the invention are combined with one another, the scraper means preferably begin scraping both from the incisions along the back bone and from the wing-joint incisions.

It is preferable for the scraper means to be actuated pneumatically as soon as the wing joints have passed.

The form of the scraper means is preferably such that they keep the meat which has been scraped off away from the bone parts of the body of the carcass part. In this way, a space is formed between the bone parts of the body of the carcass part and the back and shoulder meat. This space is used to make an incision, using a small blade, which is preferably mounted resiliently and is preferably secured to a guide, beneath the shoulder blade. During the removal of the fillet, which comprises breast meat, back meat, shoulder meat and preferably also eye meat and the second fillet, from the bone parts of the body of the carcass part at a later stage, this incision functions as an initiation point for the separation of fillet and bone parts of the body.

When using the method according to the fifth aspect of the invention, it is also possible to harvest fillets on which the skin is still present. This increases the overall efficiency which can be achieved using the method.

The invention also relates to a device for carrying out the method in accordance with the fifth aspect of the invention.

According to a sixth aspect of the invention, the processing of a carcass part of slaughtered poultry, which carcass part comprises at least part of a rib cage, part of the meat which is naturally present on said rib cage and part of at least one of the wings, the carcass part having an interior, is further optimized by a method which comprises the following steps:

applying and fixing the carcass part to a product carrier, which product carrier is moveable along a path and is preferably pivotable in a plurality of planes with respect to this path, and which product carrier is adapted to engage the interior of the carcass part, positioning the carcass part in such a manner that the longitudinal axis of the carcass part is located substantially vertically and substantially perpendicular to the conveying direction of the product carrier, and the wings or wing parts which are present hang downwards, substantially in the direction of the longitudinal axis of the carcass part, introducing the hanging wings or wing parts between horizontal guides, which extend substantially in the conveying direction of the product carriers, retaining the wings or wing parts which are present while the product carrier conveys the bone parts of the body of the carcass part onwards, with a first incision being made at the same time at the start of the wings, in such a manner that the wings or wing parts which are present remain connected to the breast meat which is present on the carcass part, increasing the distance between the wings or wing parts which are present and the bone parts of the body of the carcass part by exerting a force on the wings or wing parts which are present, in such a manner that the fillet, which comprises breast meat, back meat, shoulder meat and possibly eye meat, and the wings or wing parts which are present are together pulled off the bone parts of the body of the carcass, conveying the set comprising fillet and the wings or wing parts which are present in the downwards direction, separating the fillets and the wings or wing parts which are present at a location below the level at which the processing of the products begins, discharging fillets and wings, at a location below the level at which the processing of the products begins.

An advantageous way of harvesting fillets from carcass parts of slaughtered poultry is known from EP 0 551 156. The method of harvesting fillets described in this document is suitable for carcass parts which comprise at least part of one of the wings.

During the harvesting of the fillets in the known way, the wings or wing parts which are present are retained while the bone parts of the body of the carcass part are conveyed onwards. In this method, a first incision is also made at the wing joint. The application of a force to the wings or wing parts which are present, which force is directed away from the carcass part, and an increase in the distance between the bone parts of the body of the carcass and the wings or wing parts causes the fillet to be pulled off the bone parts of the body of the carcass. As the last step, the wings are separated from the breast fillets.

In the known device, the carcass parts are introduced into the processing device in a position which was hitherto customary in filleting lines, specifically with the longitudinal axis of the carcass part oriented substantially vertically and the neck opening facing upwards. However, this has the drawback that in the processing device for carrying out this method the location where the wings are retained and cut into, the location where the wings are separated from the fillets and the location where the wings and the fillets are discharged from the processing device have to be relatively close together. This inevitably leads to design compromises.

When using a product carrier as described in NL 1014845, it is possible for the product to be introduced into the processing device "on its head". This makes it possible for the wings to be pulled downwards away from the bone parts of the body of the carcass part, instead of having to be pulled away upwards, in the manner which is known from EP 0 551 156.

The operation of discharging the fillets and the wings or wing parts is carried out by allowing the fillets and the wings or wing parts to drop onto a conveyor belt. This conveyor belt therefore has to be arranged beneath the point at which the fillets and the wings or wing parts are separated from one another. In the known device, this point had to be located above the point at which the products enter the processing device. This leads to design problems on account of the lack of space.

In the method according to the sixth aspect of the invention, it is possible for the conveyor belt to be positioned beneath the complete processing device. As an additional advantage, it is also possible to considerably increase the distance over which the fillet is pulled off the bone parts of the body of the carcass part.

The invention also relates to a device for carrying out the method in accordance with the sixth aspect of the invention.

Figure 4:
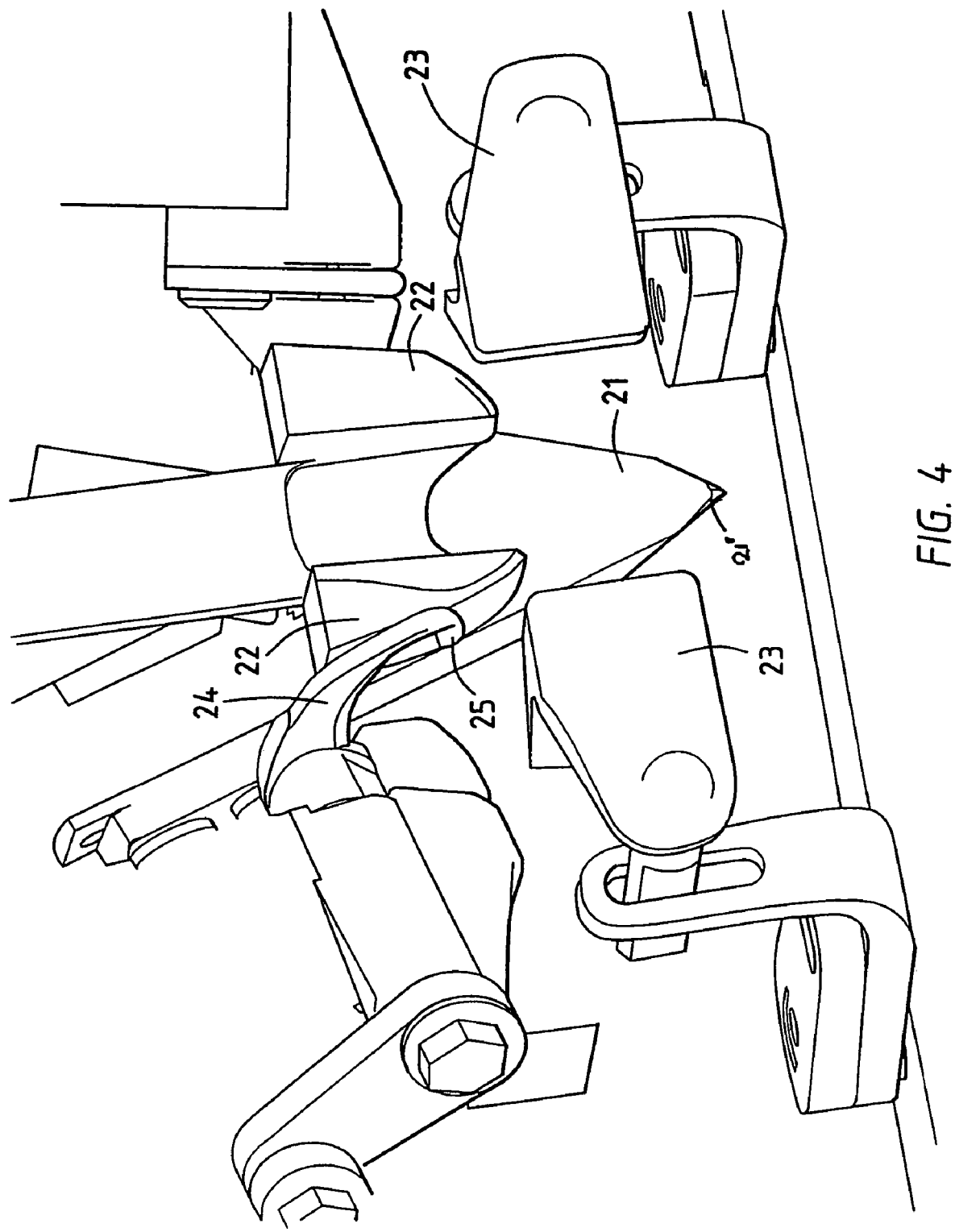
Figure 5:
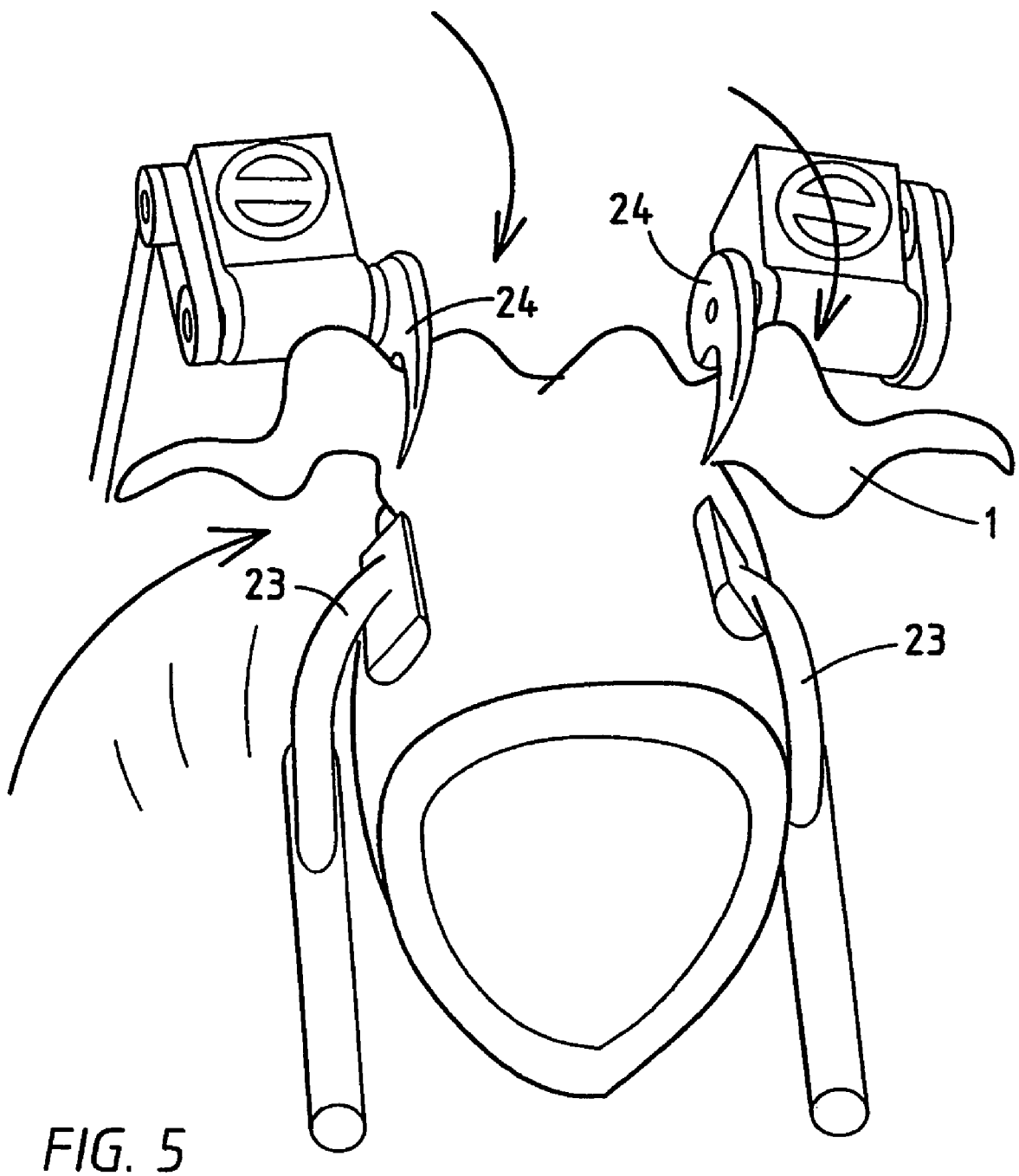
Figure 6A:
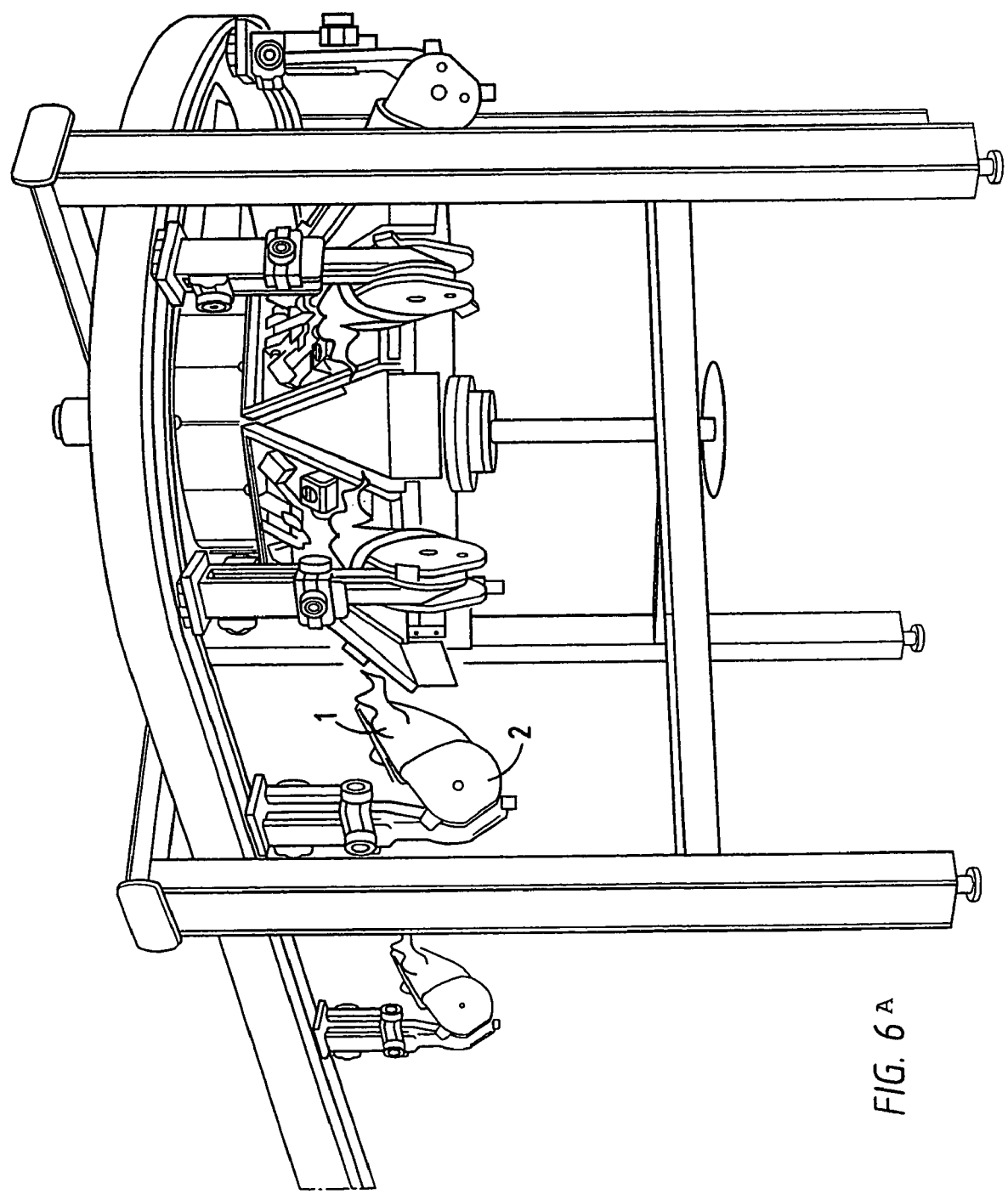
Figure 6B:
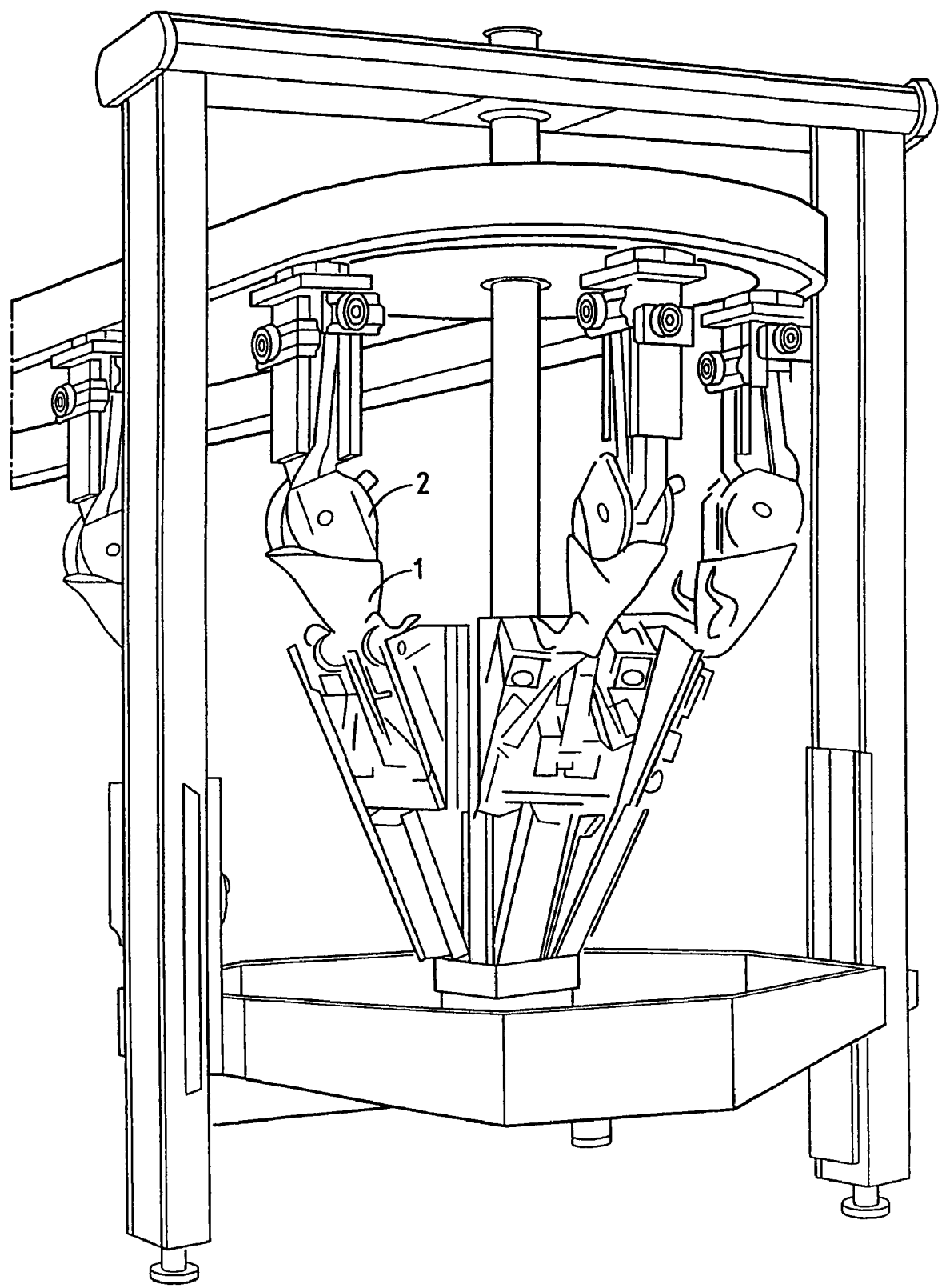
Figure 7:
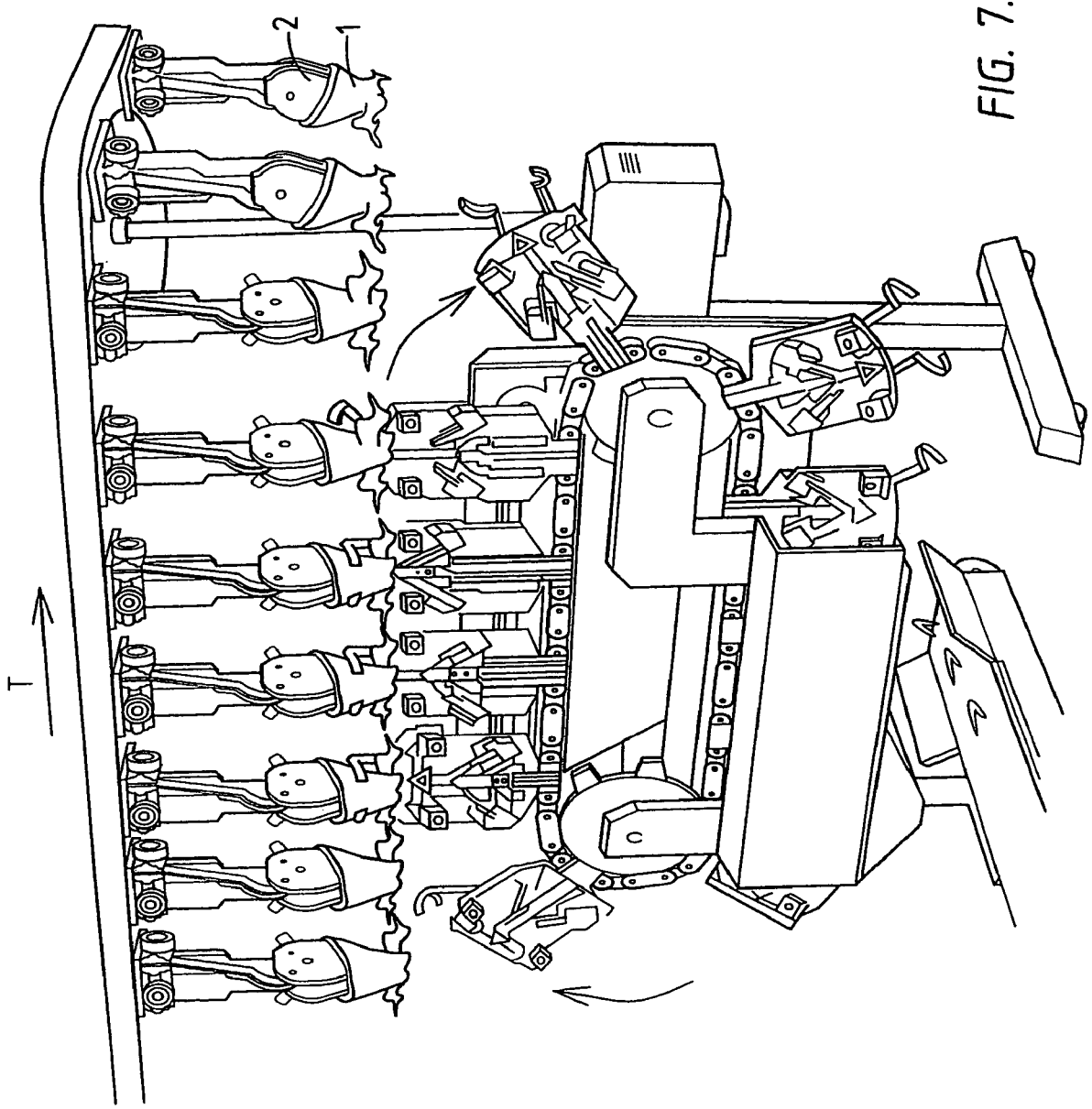
Figure 8:
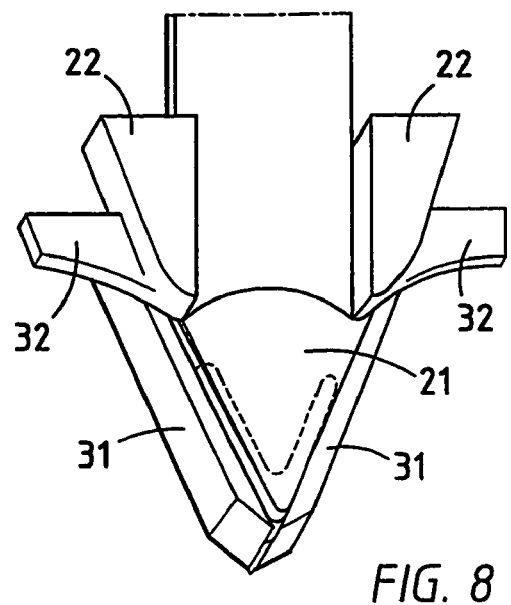
Figure 9:
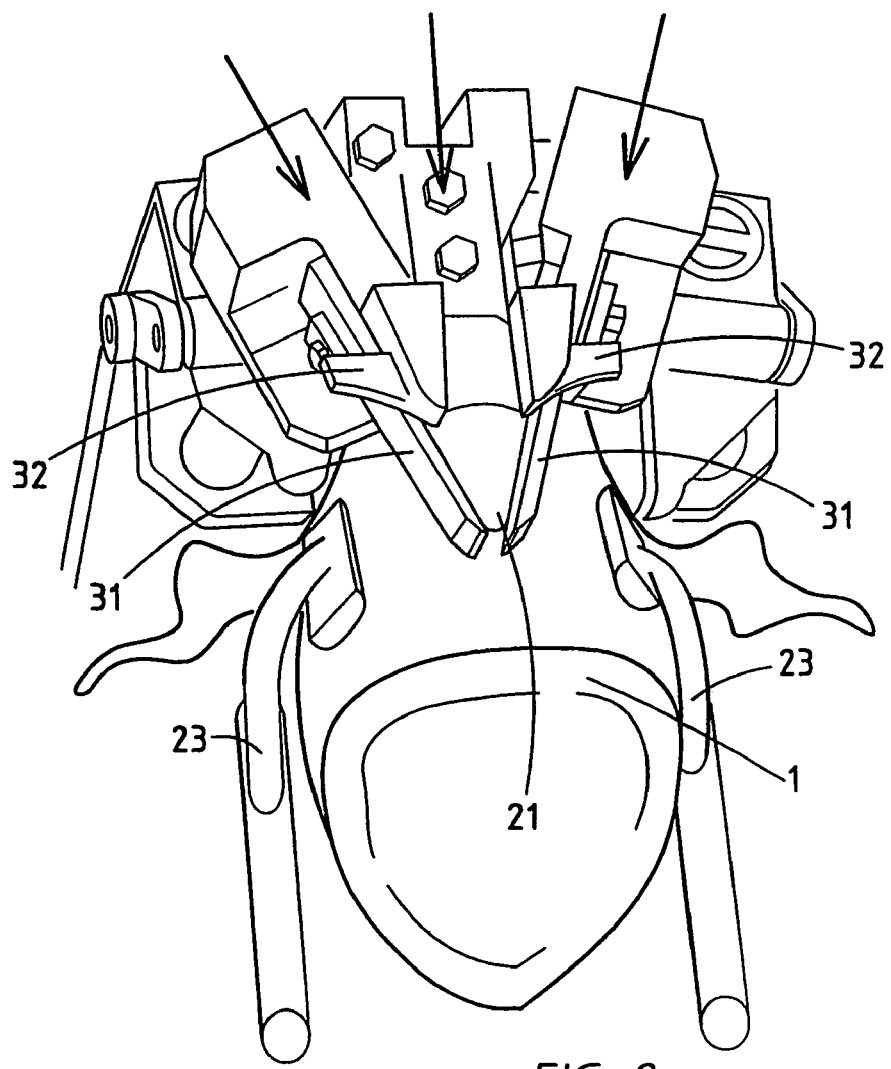
Figures 10, 11:
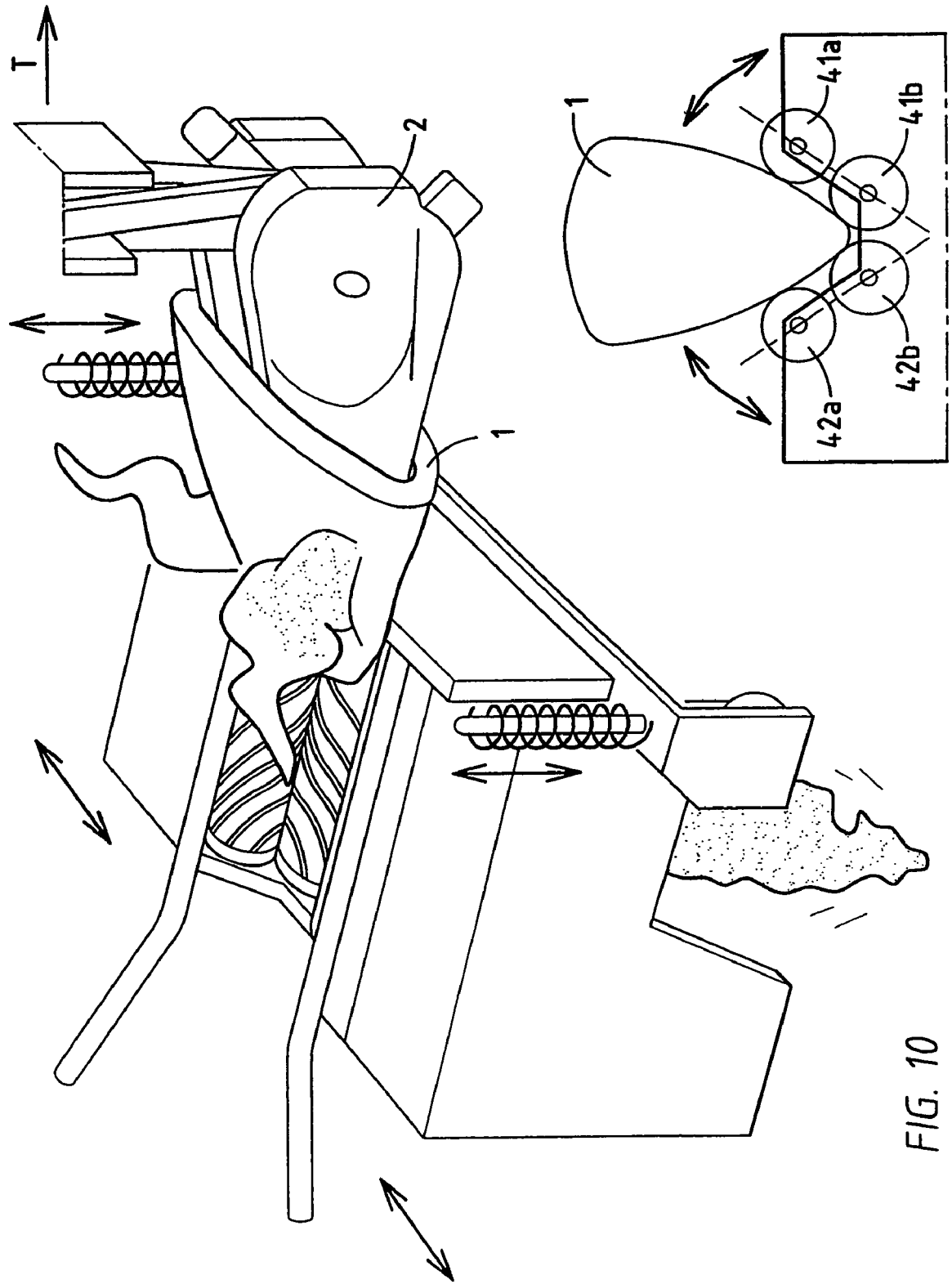
Figures 12A, 12B:
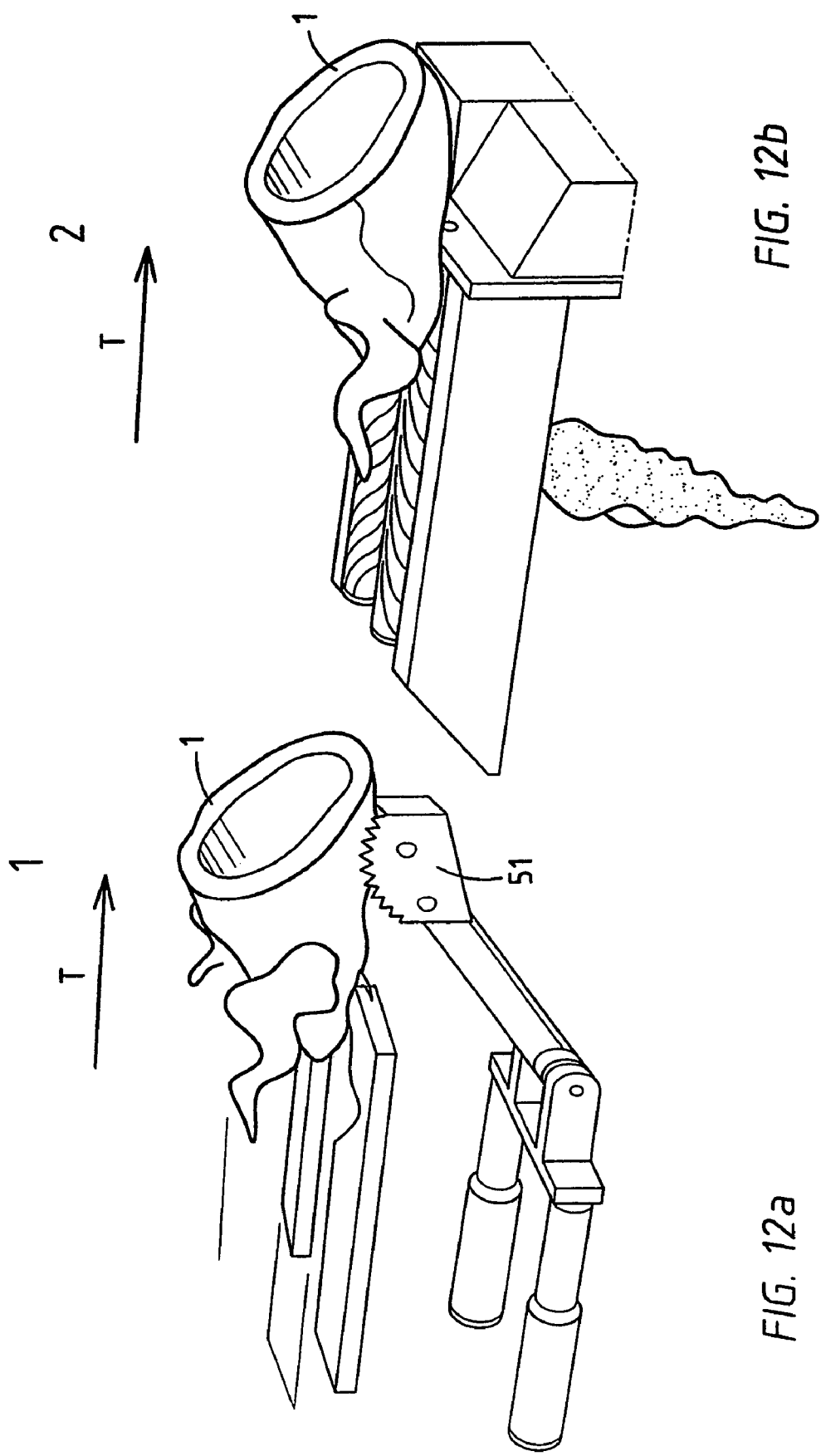
Figure 13:
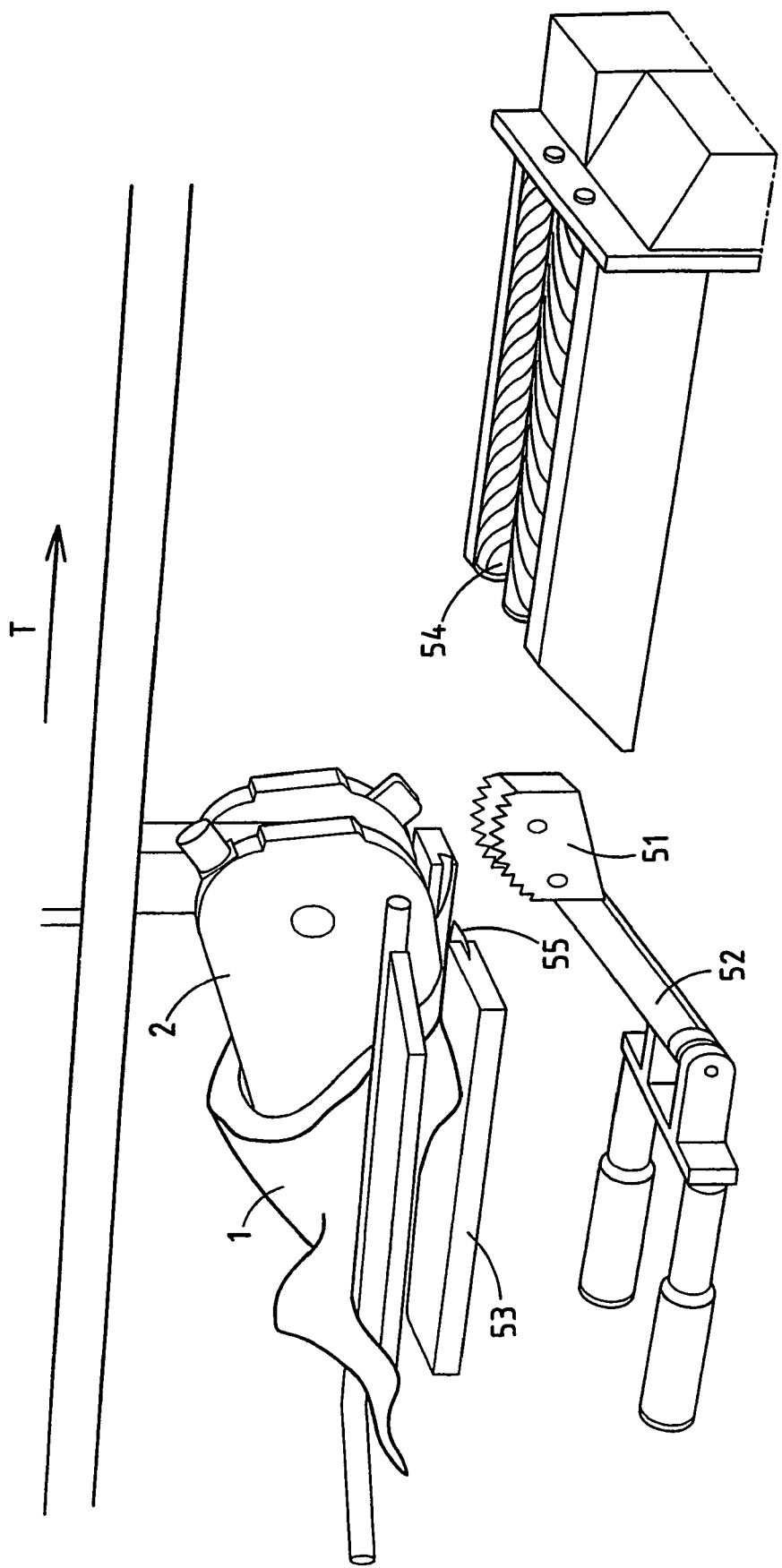
Figure 20:
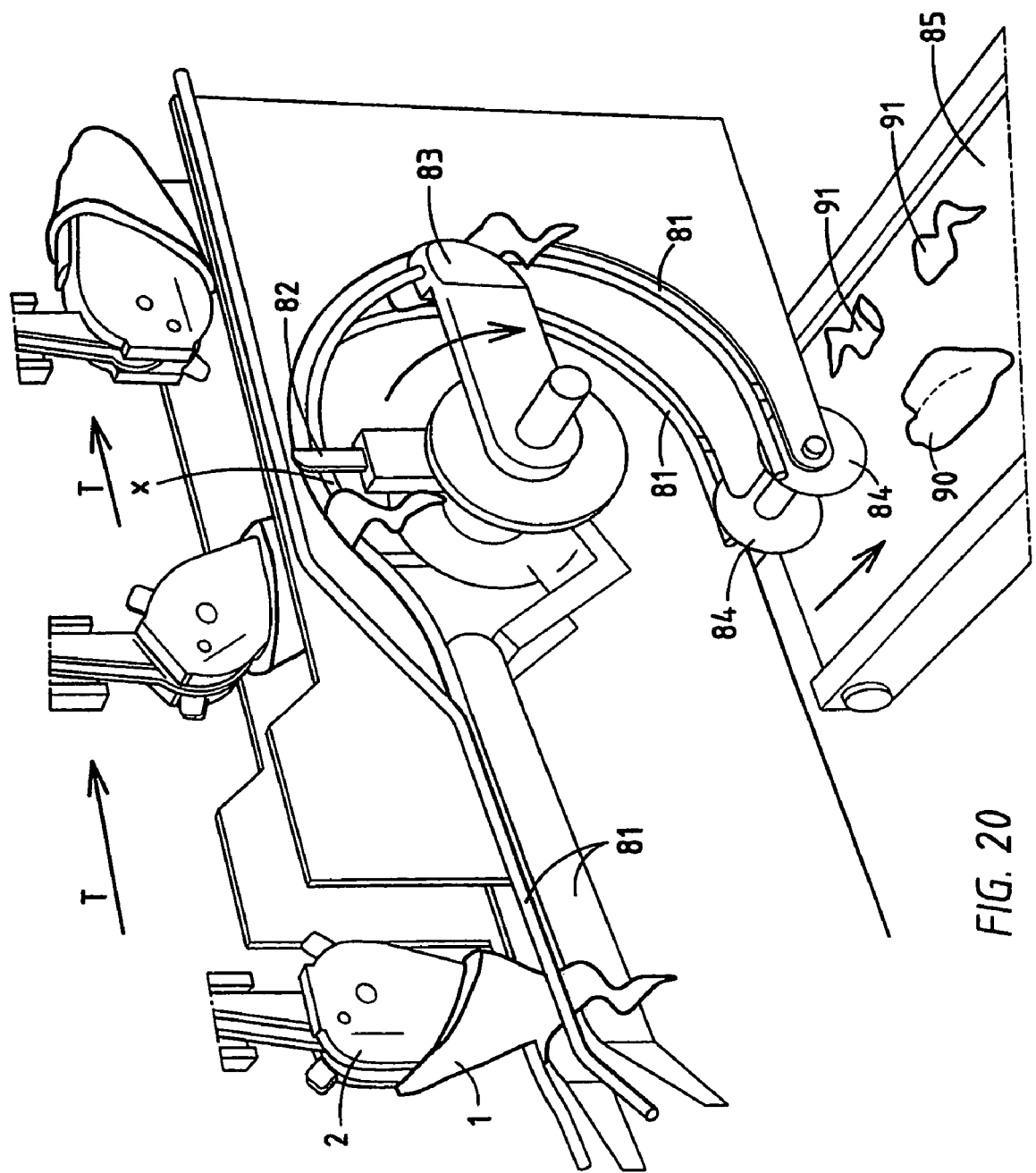
Figure 21:
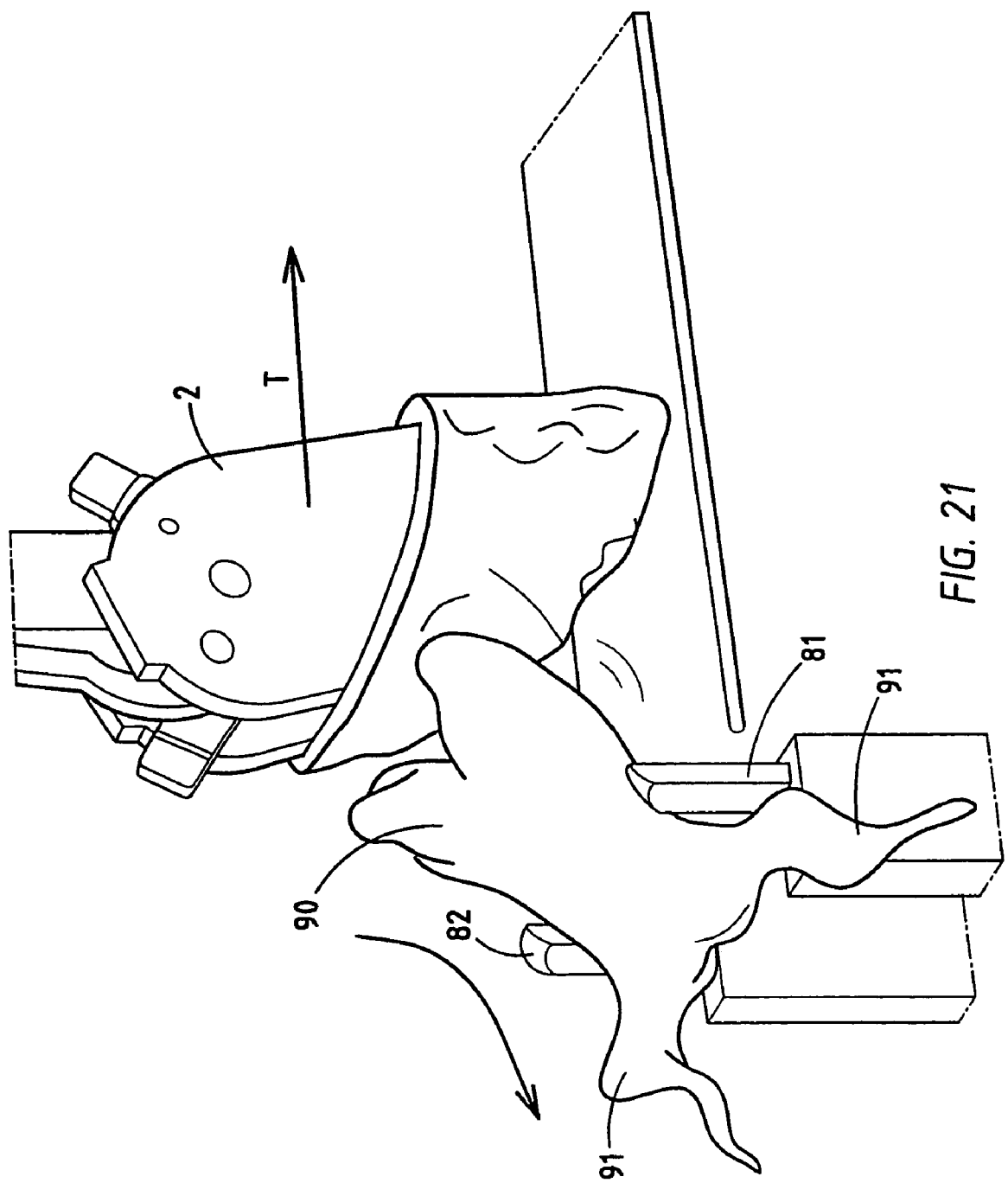
Figure 22:
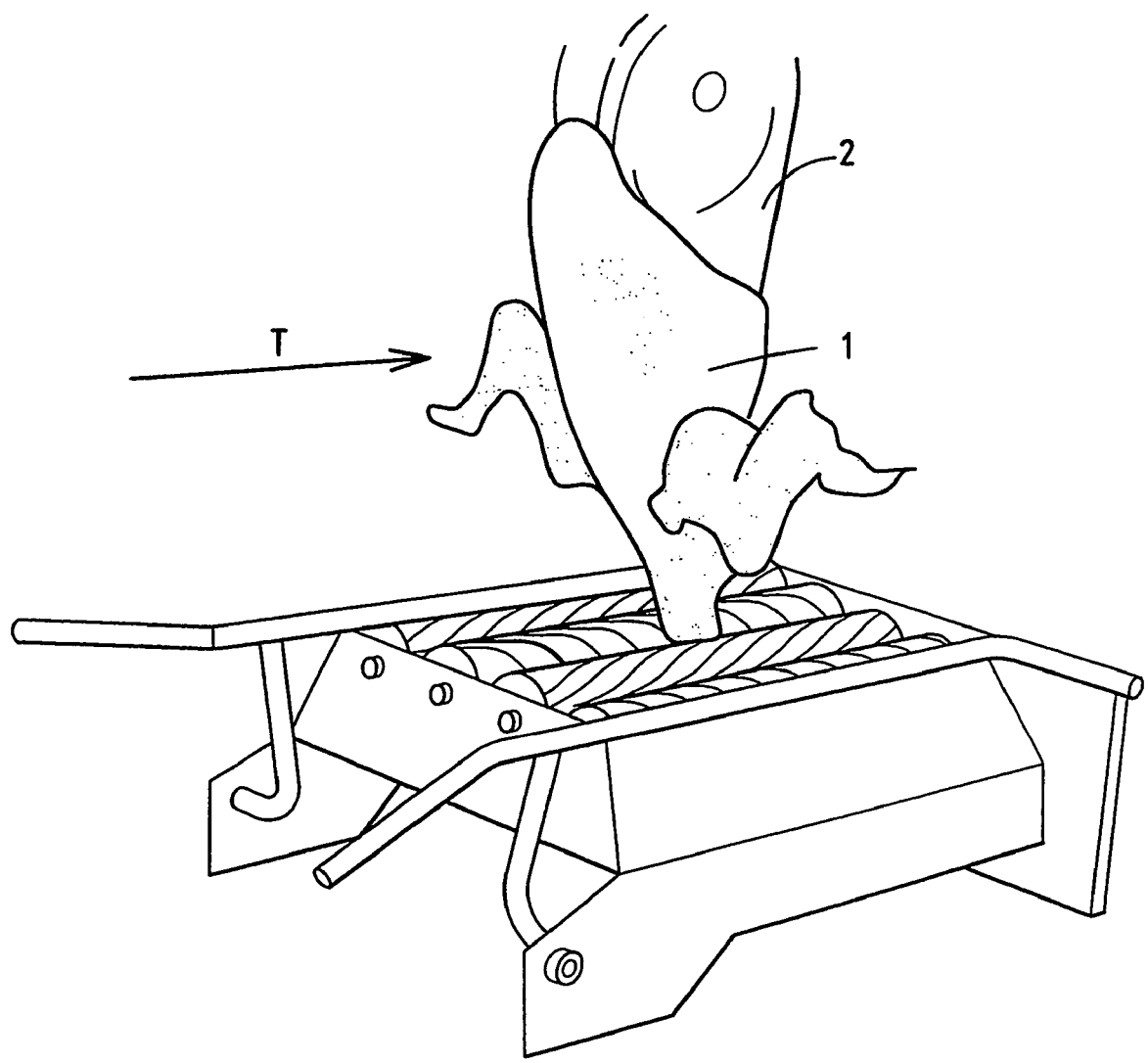
Figure 23:
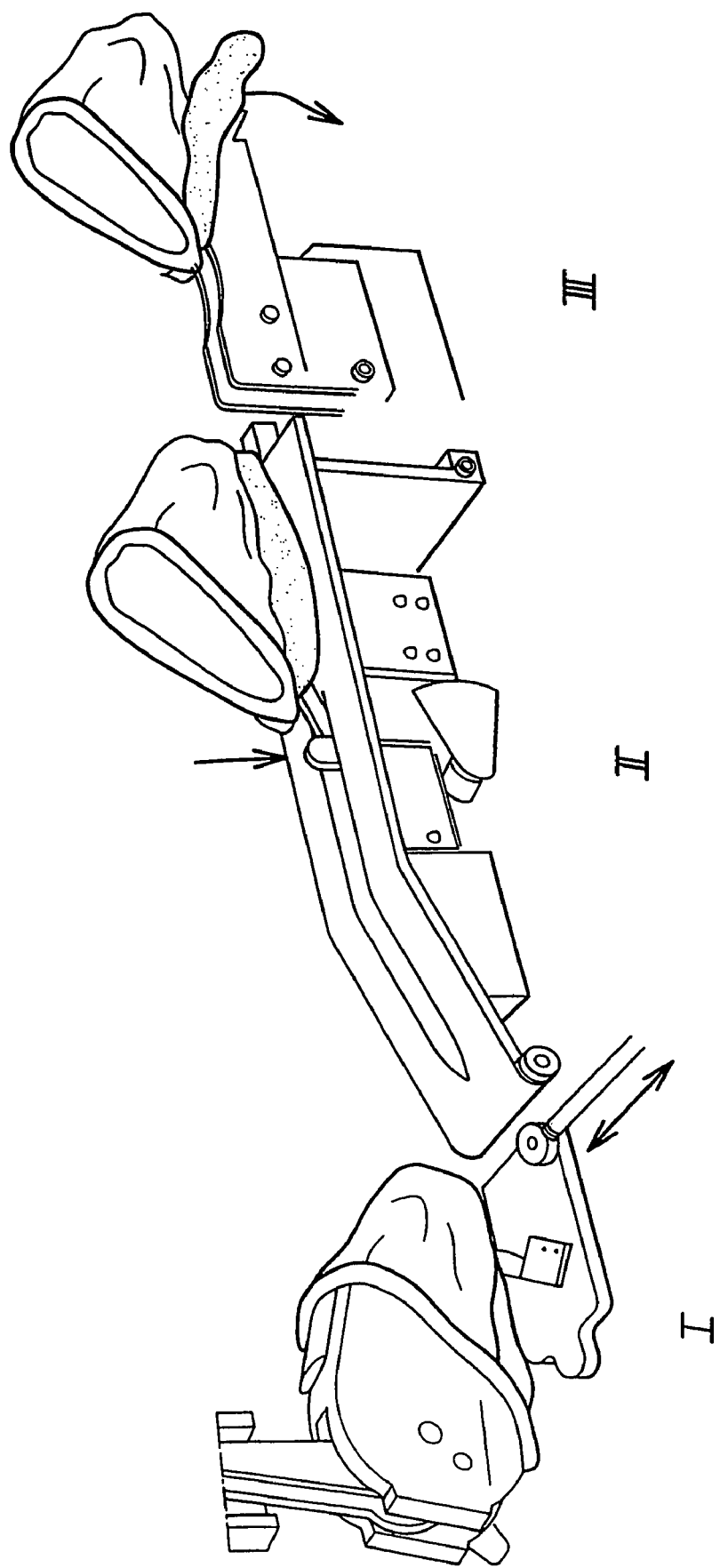
Figure 25:
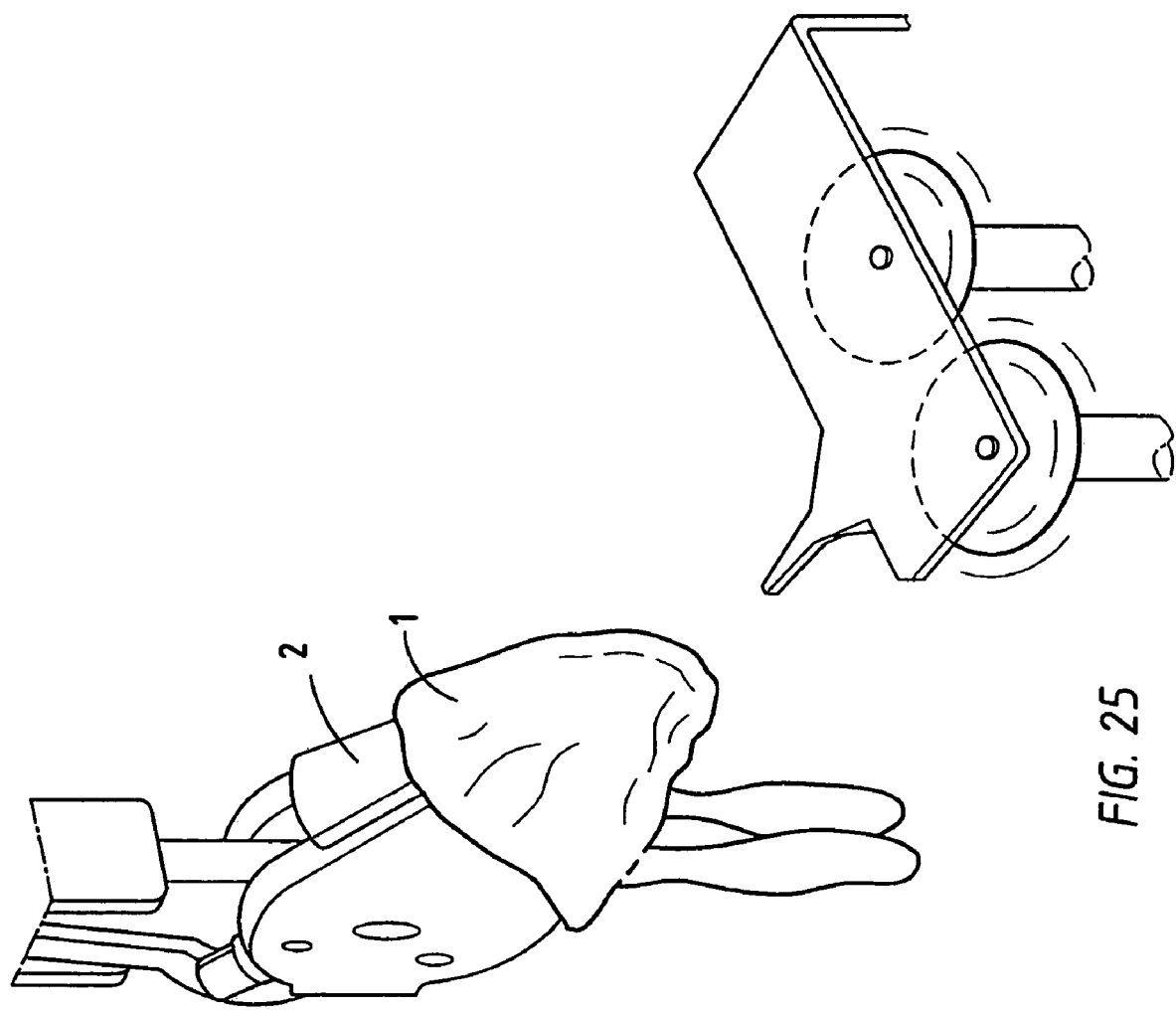
Figure 26:
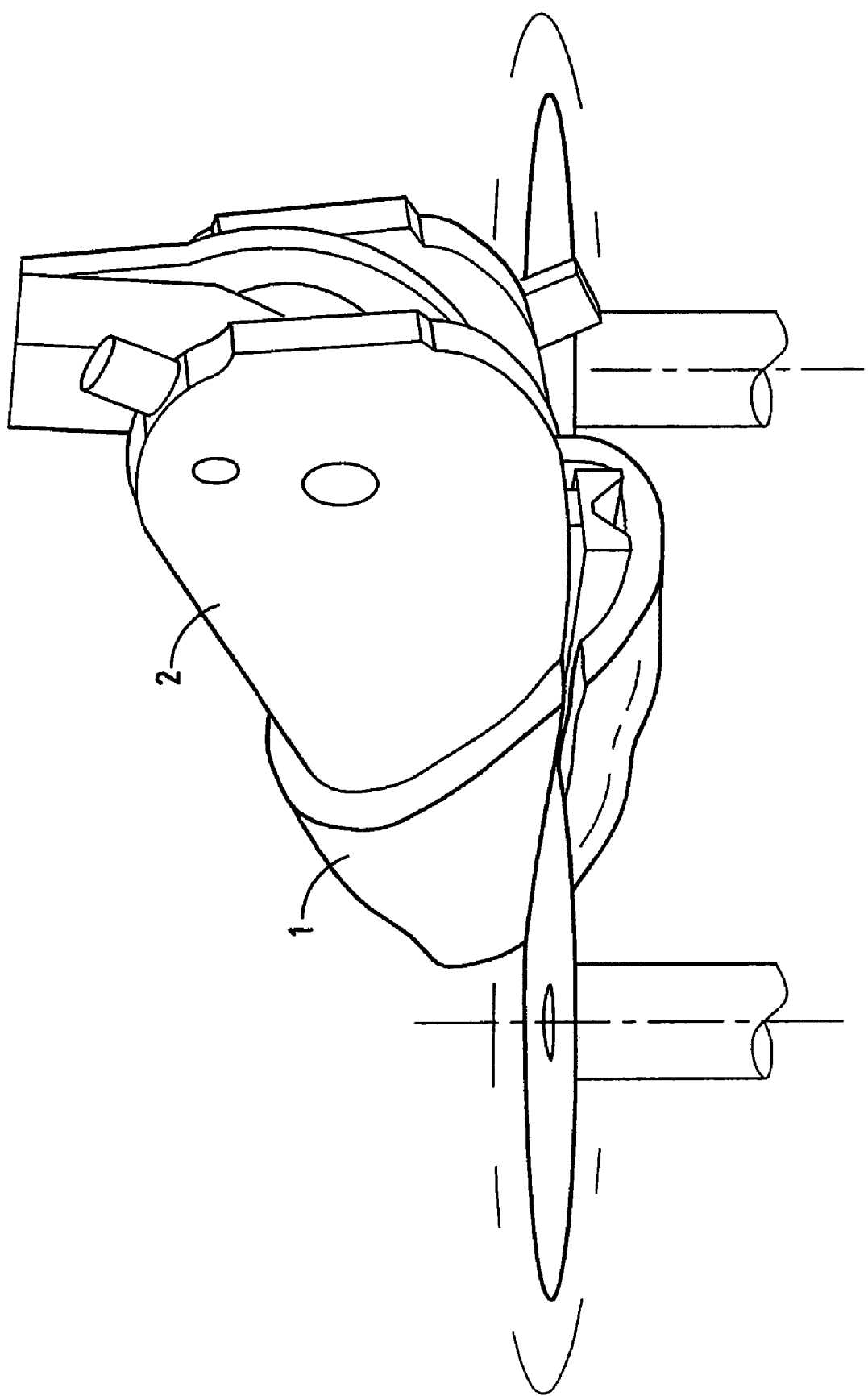

Devices and methods in accordance with various aspects of the invention will be explained in more detail below with reference to the appended drawing, which shows non-limiting exemplary embodiments and in which:

FIG. 1 shows an example of a product carrier which is suitable for use in the invention, FIG. 2 shows the way in which a carcass part is arranged on the product carrier shown in FIG. 1, FIG. 3 shows the stretching of the wings of a carcass part, FIG. 4 shows part of an example of a device in accordance with the first aspect of the invention, FIG. 5 shows wing-cutting blades in accordance with the first aspect of the invention, FIG. 6 shows devices in accordance with the first or second aspect of the invention, accommodated in a turret machine, FIG. 7 shows devices in accordance with the first or second aspect of the invention, accommodated in an alternative machine, FIG. 8 shows an example of part of the device in accordance with the second aspect of the invention, FIG. 9 shows an example of part of the device in accordance with the second aspect of the invention, FIG. 10 shows an example of the device in accordance with the third aspect of the invention, FIG. 11 shows a diagrammatic front view of the device shown in FIG. 10, FIG. 12 shows a possible embodiment of the method in accordance with the third or fourth aspect of the invention, FIG. 13 shows a possible embodiment of the method in accordance with the first part of the fourth aspect of the invention, FIG. 14 shows a number of details from FIG. 13, FIG. 15 diagrammatically depicts a possible embodiment of the method in accordance with the second part of the fourth aspect of the invention in side view, FIG. 16 shows a possible embodiment of the method in accordance with the first part of the fourth aspect of the invention, FIG. 17 diagrammatically depicts a possible embodiment of the method in accordance with the first part of the fourth aspect of the invention in a front view, FIG. 18 diagrammatically depicts a possible embodiment of the method in accordance with the fifth aspect of the invention, FIG. 19 shows a possible embodiment of the device in accordance with the fifth aspect of the invention, FIG. 20 shows a possible embodiment of the device in accordance with the sixth aspect of the invention, FIG. 21 shows a detail from FIG. 20, FIG. 22 shows a possible embodiment of a device for removing crop fat and/or neck skin, FIG. 23 shows a possible embodiment of a device for preparing for the harvesting of second fillets, FIG. 24 shows the manual harvesting of second fillets, FIG. 25 shows the automatic harvesting of second fillets, FIG. 26 shows a possible embodiment of the way in which parts are cut off the carcass part.

FIG. 1 shows an example of a product carrier 2 which is suitable for use in all aspects of the invention. This product carrier 2 is designed to support and retain the carcass part 1 which is being processed. The product carrier 2 is designed to move along a path. This is realized, for example, by securing the product carrier 2 to an overhead conveyor.

The product carrier 2 shown in FIG. 1 is pivotable in a plurality of planes, for example as indicated by arrow A and arrow B. The product carrier 2 can execute these movements either separately or in combination, while it is being conveyed along the path. The product carrier 2 also comprises an engagement surface 4, by means of which the product carrier 2 engages on the interior of the carcass part 1, i.e. on the inside of the rib cage (or that part of it which is present in the carcass part 1). The product carrier 2 also has a fixing means 3 which retains the carcass part 1 on the product carrier 2 irrespective of the position which the latter adopts.

Figures 2A, 2B:
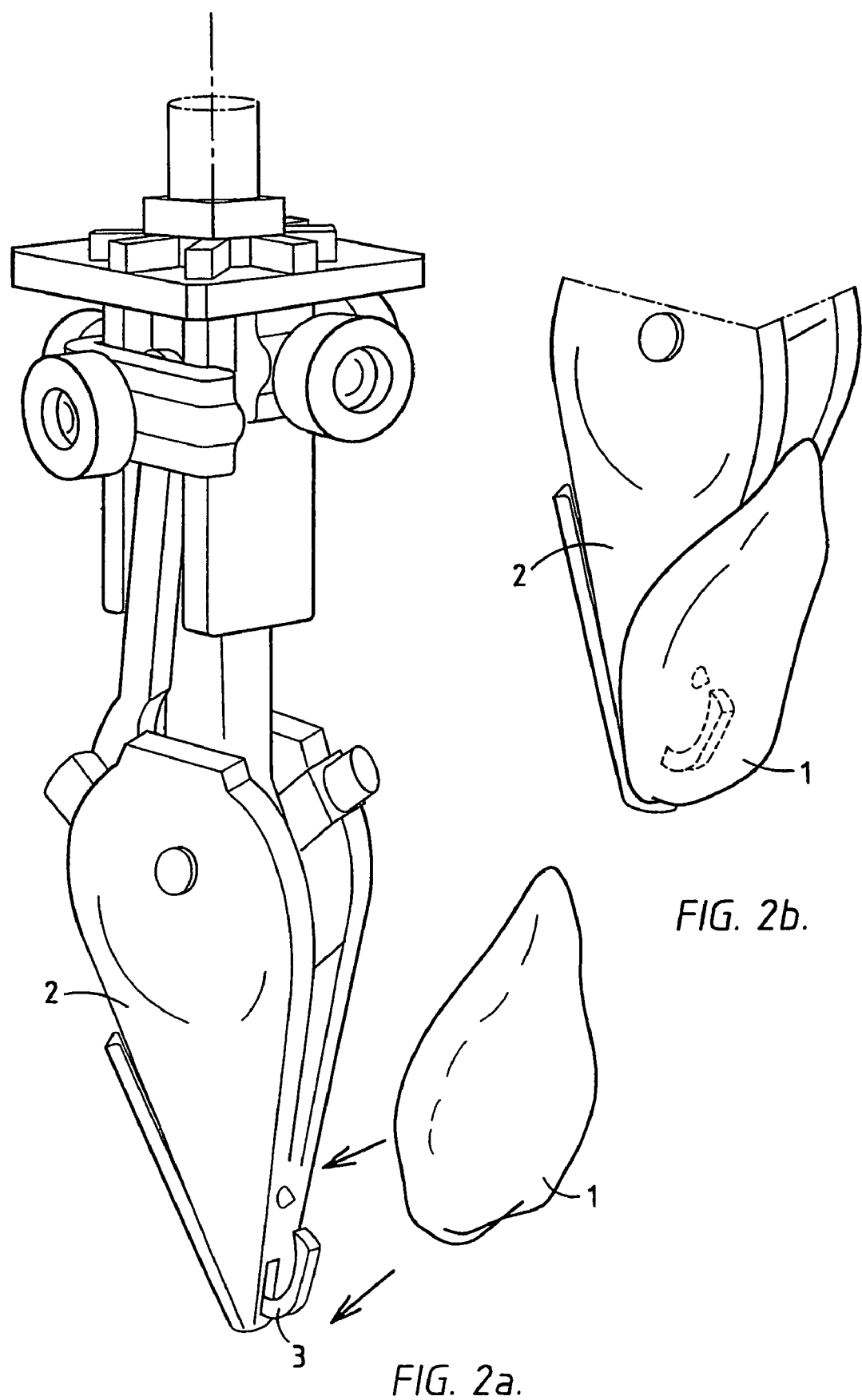
Figure 2C:
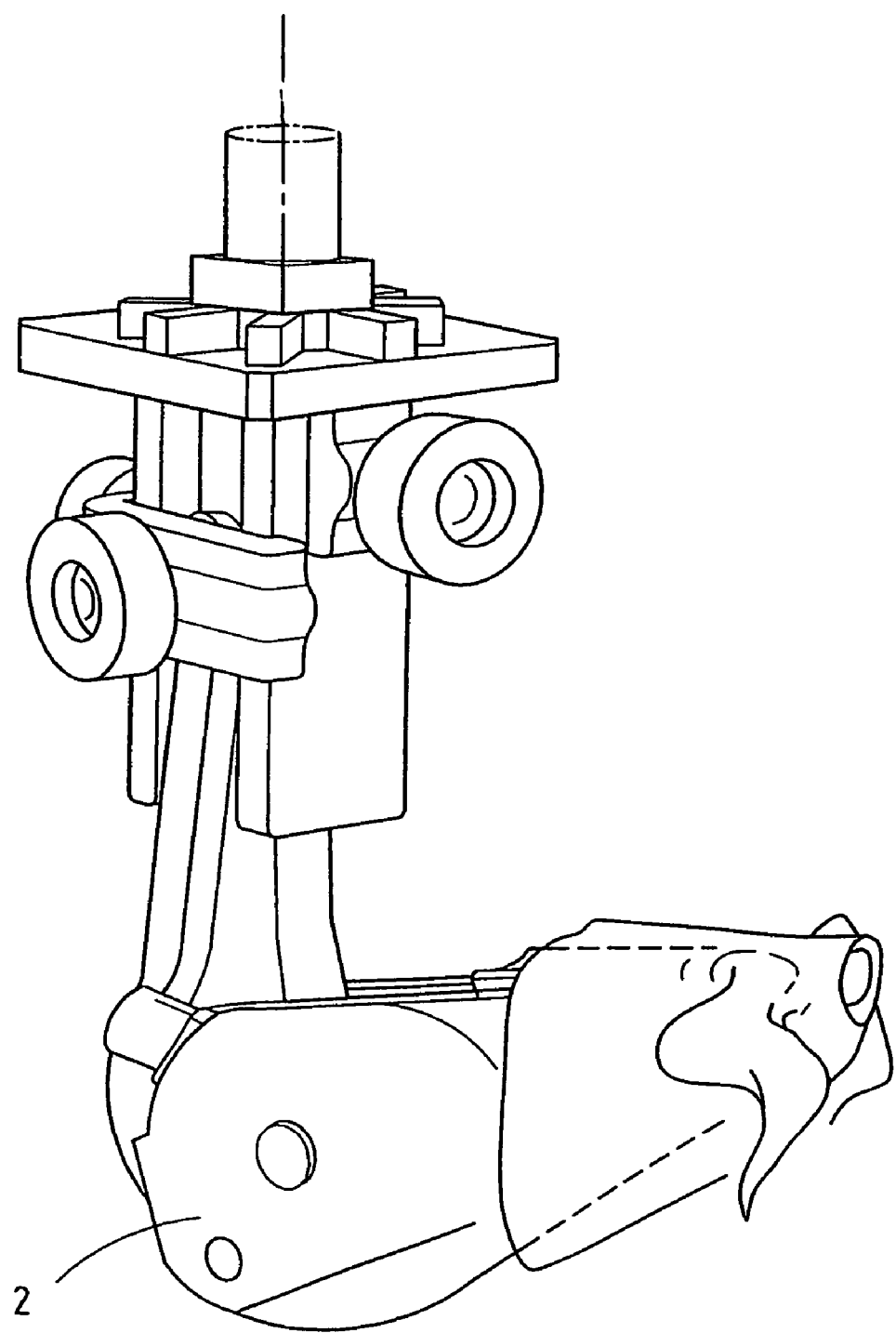

FIG. 2a and 2b show the way in which a carcass part 1 is applied to the product carrier 2. FIG. 2c shows a front half which has been applied to the product carrier 2, but other types of carcass parts can also be processed. In this context, consideration may be given, for example, to a variation in types of front halves (with complete wings, with wings without their tips, with wings with second-part incision, without wings, with neck, with neck skin, etc.), breast caps, carcass parts without backbone, etc. The carcass parts which are to be processed, before being processed, in each case comprise at least part of the ribs and part of the meat which is naturally present thereon.

As soon as the carcass part 1 has been applied and fixed to the product carrier 2, it can successively undergo various processing operations, which ultimately involve various parts of the carcass part 1 being separated.

Prior to the processing operations, the product carrier 2 can guide the carcass part 1 which is to be processed through a wing-stretching module. This has the advantage that after having passed this module all the wings or wing parts which are present are hanging in a more or less reproducible position with respect to the carcass part 1. Carcass parts without wing parts are preferably guided around this module.

FIG. 3 shows an example of a wing-stretching module. This module in this case comprises two rotating elements 11 which are positioned at a certain distance from one another. The carcass part 1 is guided between the rotating elements 11, with resilient elements 12 which are positioned on the rotating elements 11 stretching the wings or wing parts. These resilient elements 12 may, for example, be formed by rubber plucking fingers. FIG. 3b also shows the direction of rotation of the two rotating elements 11; in FIG. 3a, T denotes the conveying direction of the carcass part 1 as it follows the path.

A carcass part 1 which, in addition to at least part of the rib cage and which is naturally present thereon, also comprises a neck opening and a wing joint, preferably with at least a part of the wing still attached to the wing joint can be processed using a device and a method in accordance with the first aspect of the invention.

The device in accordance with the first aspect of the invention comprises a wing-joint positioning member 21, which is designed to be introduced into the carcass part 1. This wing-joint positioning member 21 is provided with one or more wing-joint positioning surfaces 22. In the exemplary embodiment shown in FIG. 4, there are two of these surfaces. In the exemplary embodiment of FIG. 4, the wing-joint positioning member 21 is provided with a cutting edge 21' for cutting the wishbone loose from the other parts of the carcass part.

The wing-joint positioning surfaces 22 are arranged in such a manner that in a defined position of the wing-joint positioning member 21 with respect to the carcass part 1 (for example the lowest position of the wing-joint positioning member 21 with respect to the carcass part 1) they each hold a wing joint at least substantially into a predetermined, reproducible position from the inside of the carcass part 1.

Furthermore, the device comprises pressure-exerting means 23 for pressing on the carcass part 1 from the outside. In this way, any wing joint which is present is reproducibly supported by the joint-positioning surface 22 of the wing-joint positioning member 21. As a result, the wing joints which are present are accurately held into the predetermined position in a particularly reliable way.

If the carcass part 1 also comprises at least part of the wishbone, which has to be cut loose from the carcass part it is advantageous if the wing-joint positioning member 21 is also designed to at least partially cut that part of the wishbone which is present loose from the carcass part 1. To this end, the wing-joint positioning member is preferably provided with a suitable cutting edge 21'. Further means may also be present for cutting the wishbone (or that part of the wishbone which is present) loose and removing it from the carcass part 1. In this context, consideration may be given, for example, to a combination of the first aspect of the invention with the second aspect of the invention. In that case, the wing-joint positioning member 21 is used as first wishbone blade, which first wishbone blade is described in relation to the second aspect of the invention.

Accurate positioning of the wing joints is important if it is desired for accurate processing operations to be carried out on the wing joints.

Such a situation arises if the carcass part 1 also comprises one or more inner fillets (also known as "second fillets"). In that case, it is desirable for just some of the connecting tendons between a wing part and the other parts of the carcass part 1 to be cut through, in such a manner that at least one connecting tendon between the outer fillet and a wing part remains intact. As a result, during the harvesting of the outer fillet the inner fillets remain behind on the bone parts of the body of the carcass part 1, and the inner fillets can then be harvested automatically or manually in a known way (preferably as described in EP 0 695 506). One advantage of manual harvesting is that final inspection of the carcass part 1 can then take place at the same time.

Another example of a processing operation on the wing joint which requires accurate positioning is the cutting through of the wing joint, in which case the wing-cutting blade which is used to make the incision moves substantially between the bone parts of each wing joint, and in which case after the cutting operation a connection remains between the wing part and an other part of the carcass part 1.

According to the first aspect of the invention, these two accurate processing operations are preferably carried out using special sickle-shaped wing-cutting blades 24 which comprise a facet 25 which prevents the tendons which are to be cut through from slipping off the blade during the cutting operation. The blades also act as a wedge which pushes the bone parts of the wing joint apart. FIG. 5 shows the introduction of the wing-cutting blades 24.

To enable high production rates to be achieved, it is preferable for a number of devices in accordance with the first aspect of the invention to be accommodated in a turret machine, as shown in FIG. 6. FIG. 7 shows an alternative arrangement.

In the case of processing of products having a neck or neck skin, the neck or neck skin may impede the introduction of the wing-joint positioning member 21. To prevent this, the device according to the invention is preferably provided with means which hold the neck or neck skin away from the neck opening, for example guides.

It is preferable for the device and method in accordance with the first aspect of the invention to be combined with the device and method in accordance with the second aspect of the invention. In that case, the wing-joint positioning member 21 is provided with a suitable cutting edge, so that the wing-joint positioning member can be used as first wishbone blade.

The second aspect of the invention relates to a method and device for the processing of a carcass part 1 of slaughtered poultry. The carcass parts which can be processed in accordance with the corresponding method and using the corresponding device comprise at least part of the ribs, part of the meat which is naturally present thereon, a neck opening and part of the wishbone. In the example described below, the entire wishbone is present.

In the second aspect of the invention too, the carcass part 1 which is to be processed is applied and fixed to a product carrier 2 of the type described above.

To enable the wishbone to be removed, a block is introduced into the carcass part 1 through the neck opening. The block has a recess for receiving the wishbone and is arranged between the two limbs of the wishbone.

Then, a first wishbone blade 21 is introduced into the carcass part 1 via the neck opening, in such a manner that it is positioned next to one side of the block in the carcass part 1.

The first wishbone blade 21 has a cutting edge, the contour of which substantially corresponds to the outer contour of the complete wishbone, so that as it is introduced it cuts loose that side of the wishbone which faces the back side of the carcass part 1. In this example, the first wishbone blade 21 is substantially in the shape of an arrow.

Then, two second wishbone blades 31 are moved into the carcass part 1 along either side of the block, substantially perpendicular to the first wishbone blade 21. The second wishbone blades 31 substantially follow the outer contour of the wishbone and cut the wishbone off the carcass part 1. The wishbone which has been cut loose is then enclosed between the block, the first wishbone blade 21 and the second wishbone blades 31.

To remove the wishbone from the carcass part 1, the block, the first wishbone blade 21 and the second wishbone blades 31 are together pulled back out of the carcass part 1 while the wishbone remains enclosed between the block, the first wishbone blade 21 and the second wishbone blades 31. In this way, the wishbone is removed from the carcass part 1.

To combine the first and second aspects of the invention, the first wishbone blade 21 is preferably provided with wing-joint positioning surfaces 22.

FIGS. 8 and 9 show additional cutting surfaces 32 which are added to the first wishbone blade 21. The addition of these additional cutting surfaces 32 further widens the first wishbone blade 21 on the wide side of the arrowhead. This makes the first wishbone blade 21 significantly wider on the wide side than the wishbone at that location.

The local widening of the first wishbone blade 21 allows the meat to be cut loose from the underlying bone parts as far as the immediate vicinity of the wing surface. This ensures that the meat between the wishbone and the wing joint is harvested with the fillet.

When the wishbone has been removed from the carcass part 1, the first wishbone blade 21 and the second wishbone blades 31 are moved back to a greater distance from the block. In the first instance, the wishbone is then still on the block. It is preferable to use compressed air to remove the wishbone from the block. The device preferably comprises compressed-air means for removing the wishbone or that part of the wishbone which is present from the block.

In the case of processing products with a neck or neck skin, the neck or neck skin may impede the introduction of the block and/or the first wishbone blade 21. To prevent this, the device according to the invention is preferably provided with means which hold the neck or neck skin away from the opening, for example guides.

To enable high production rates to be achieved, it is preferable for a number of devices in accordance with the second aspect of the invention to be accommodated in a turret machine, as shown in FIGS. 6 and 7.

The third aspect of the invention relates to optimization of the processing of carcass parts which at least comprise part of the ribs, part of the meat which is naturally present thereon and part of the skin.

In the third aspect of the invention too, the carcass part 1 which is to be processed is applied and fixed to a product carrier 2 of the type described above.

In the exemplary embodiment described, prior to the actual skinning at least part of the skin which is to be removed is tucked up using a tucking-up means 51, such as for example the toothed block on a sprung arm 52 shown in FIG. 12*a*. However, the tucking-up means 51 may also be designed in a completely different form, for example as a rough brush or as a helical tucking-up means.

The carcass part 1 is then moved past at least two pairs of interacting, resiliently mounted skinning rolls 41*ab*, 42*ab*. That part of the carcass part 1 which is to be skinned is pressed onto the skinning rolls 41*ab*, 42*ab*, in such a manner that the skinning rolls 41*ab*, 42*ab* grip the skin which is to be removed and pull it off the carcass part 1.

According to the third aspect of the invention, the positioning of the skinning rolls 41*ab*, 42*ab* with respect to one another is matched to the expected contour of the carcass part 1, i.e. the contour of the carcass part 1, as seen in the opposite direction to the conveying direction T, overall corresponds to the shape of the space between the skinning rolls 41*ab*, 42*ab*.

To further optimize the skinning operation, the orientation of the carcass part 1 with respect to the skinning rolls 41*ab*, 42*ab* is adapted as it moves past the said skinning rolls 41*ab*, 42*ab*, so that the carcass part 1 is always positioned as optimally as possible with respect to the skinning rolls 41*ab*, 42*ab*.

It is preferable for the skinning rolls 41*ab*, 42*ab* to be provided with a helical profile. Other profiles, for example with teeth, are also possible, however.

As an alternative to the conventional skinning rolls, it is also possible to use rind-removal rolls, optionally in combination with scraper elements.

If both back skin and breast skin are present on the carcass part 1, it is preferable for the breast skin to be removed before the back skin is removed.

The fourth aspect of the invention relates to processing of carcass parts which comprise at least part of the ribs, part of the meat which is naturally present thereon, part of at least one of the wings and part of the back skin, the breast skin and the wing skin.

In the fourth aspect of the invention too, the carcass part 1 which is to be processed is applied and fixed to a product carrier 2 of the type described above.

Then, the carcass part 1 is positioned accurately and reproducibly with respect to a first processing unit, which is designed to make a first incision 56 in the skin. In the example described, this positioning is at least partially realized by an active role of the product carrier 2.

The example shown in FIG. 13 also makes use of two moveable breast-positioning plates 53. There are preferably also means which press the breast meat slightly away from the location where the incision is to be made.

In the first processing unit, which forms part of the device in accordance with the fourth aspect of the invention, an accurate, reproducible first incision 56 is made in the skin in the region of the connection between body and wing, on the side of the breast, in such a manner that the first incision 56 comes to lie at virtually the same location on the carcass part 1 of each product, irrespective of the size of the product. This is made possible by the accurate positioning of the product carrier 2 with respect to the first processing unit. In this context, it is particularly advantageous for the product carrier 2 used to engage on the inside of the carcass part 1, with the result that the deviations which are to be corrected for with respect to an average product are relatively small.

First cutting means 55, which in the exemplary embodiment shown are designed as two static blades, are provided for the purpose of making the first incision 56.

Figures 14A, 14B:
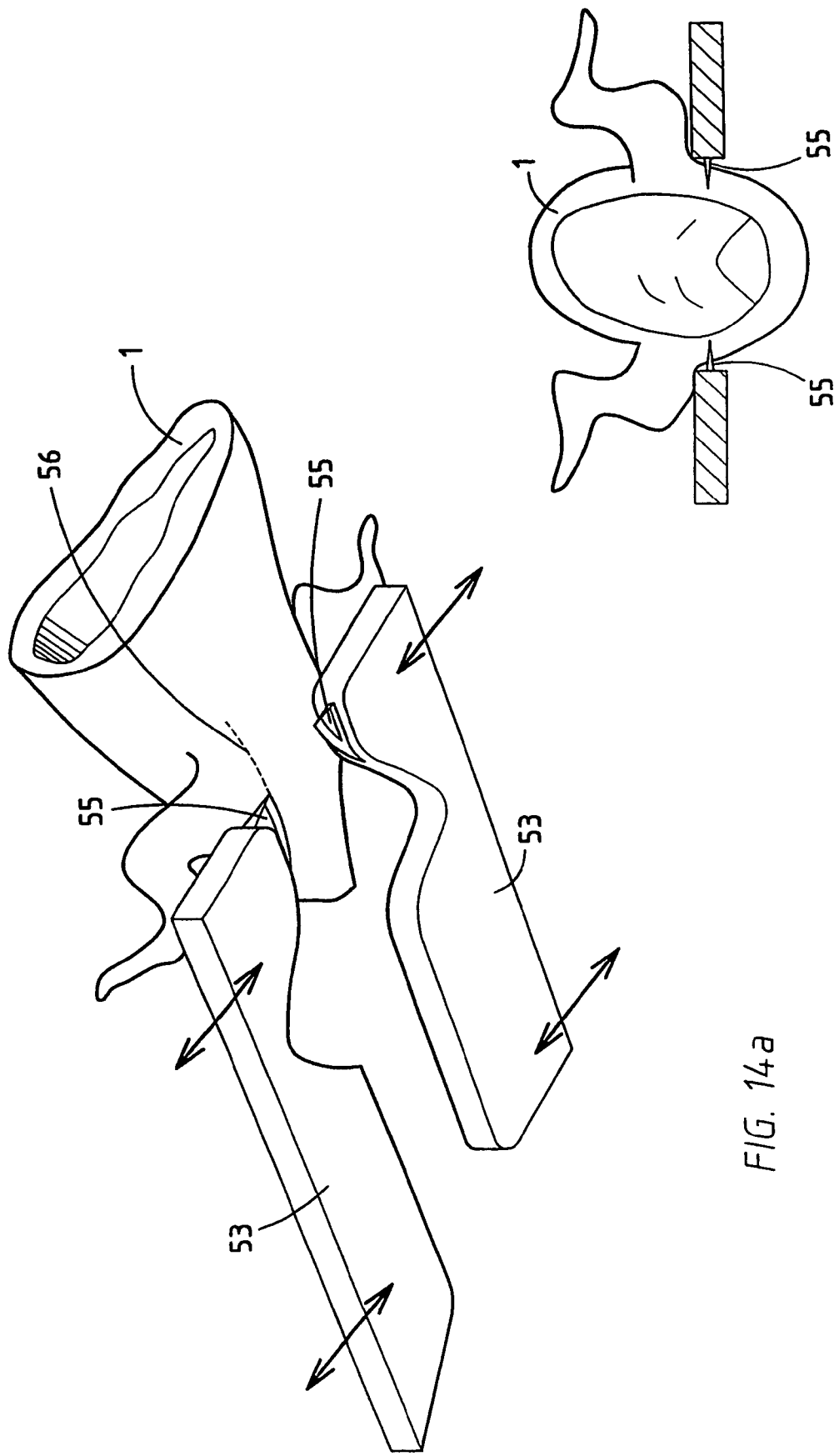

FIGS. 14*a* and 14*b* show the first cutting means 55 and the breast-positioning plates 53 in more detail.

In accordance with FIG. 12*a* and FIG. 13, at least part of the breast skin is tucked up after positioning. This can be done, for example, using the toothed block on a sprung arm 52 shown in FIG. 12*a*. However, the tucking-up means 51 may also be of completely different design, for example may be formed by a rough brush or a helical tucking-up means. The advantage of tucking up the skin is that the skinning rolls 54 gain a better grip on the skin which is to be pulled off. This results in a much more reliable skinning process in particular in the case of dry and/or hung products.

After it has been tucked up, the breast skin is removed. This is achieved by moving the carcass part 1 past at least one pair of interacting skinning rolls 54, in such a manner that the skinning rolls 54 grip the breast skin and pull it off the carcass part 1. In the process, the breast skin tears off at the first incision 56 made in the skin, with the result that the back skin and the wing skin remain connected to the carcass part 1.

Then, the carcass part 1 is accurately and reproducibly positioned with respect to a second processing unit, which is designed to make a second incision 62 in the skin. In the example described, this positioning is at least partially realized by an active role being played by the product carrier 2.

The carcass part 1 is in a defined first orientation with respect to the conveying direction T as it enters the second processing unit. In the example shown in FIG. 15*a*, this orientation involves the longitudinal axis of the carcass part 1 being oriented substantially vertically and perpendicular to the conveying direction T, and with the back side of the carcass part 1 facing in the downstream direction.

Second cutting means 61 then make an accurate and reproducible incision in the skin in the region of the connection between body and wing, on the side of the back.

While the second incision 62 is being made, the carcass part 1 is moved from the first orientation into a second orientation with respect to the conveying direction, so that a curved second incision 62 is formed. In the example shown in FIGS. 15, 16 and 17, the second cutting means 61 are designed as two rotating blades.

One example of a second orientation is shown in FIG. 15*b*, wherein, in the second orientation, the longitudinal axis of the carcass part 1 comes to lie substantially horizontally, parallel to the conveying direction, and the neck opening of the carcass part 1 faces upstream.

The transition from the first orientation to the second orientation is illustrated in FIGS. 15*a* and 15*b*. FIG. 15*b* also shows the curved second incision 62.

After the breast skin has been tucked up, in a similar manner to the tucking-up of the breast skin, the back skin is removed as a result of the carcass part 1 being moved past at least one pair of interacting skinning rolls 54, in such a manner that the skinning rolls 54 grip the back skin and pull it off the carcass part 1. The back skin tears off at the second incision 62 between body and wing, with the result that a predetermined part of the wing skin remains connected to the carcass part 1.

Both the first and the second cutting means 61 are preferably to be adjusted in such a way that they only cut into the skin and do not touch the meat below it. As a result, the fillets retain an intact surface.

The fifth aspect of the invention relates to processing of carcass parts which comprise at least part of the ribs and part of the meat which is naturally present thereon, on both the breast side and the back side.

In the fifth aspect of the invention too, the carcass part 1 which is to be processed is applied and fixed to a product carrier 2 of the type described above.

Back-cutting means 71 make two incisions in the meat on the back side of the carcass part 1. These incisions extend on either side of the backbone (or the location in the carcass part 1 where the backbone was located before being removed), and run substantially parallel thereto. This is shown in FIGS. 18 and 19. In this example, the back-cutting means 71 are designed as rotating blades.

Scraper means 72 loosen the back and shoulder meat from the bone parts of the body of the carcass part 1, in such a manner that a connection between the back and shoulder meat, on the one hand, and the breast meat—which is still connected to the bone parts of the body of the carcass part 1—on the other hand remains in existence. The scraper means 72 start scraping from the incisions which have already been made by the back-cutting means 71 on either side of the backbone. If a wing-joint incision has also been made, for example by the sickle-shaped wing-cutting blades 24, the scraping preferably begins from both the incisions which have been made by the back-cutting means 71 on either side of the backbone and from the wing-joint incisions.

The scraper means 72 are preferably mounted resiliently and are preferably actuated pneumatically after the wing joints have moved past.

The scraper means 72 shown in FIG. 19 and the guide plates 73 which follow them are formed in such a manner that they hold the meat which has been scraped off at a certain distance from the bone parts of the body of the carcass part 1. As a result, a space is formed between the said bone parts and the back and shoulder meat. In the example shown in FIG. 19, this space is used for an incision to be made beneath the shoulder blade by small resiliently mounted blades 74. As a result, the pellicle which is present can be harvested more easily with the meat.

Then, the breast meat is removed from the bone parts of the body of the carcass part 1, in such a manner that the breast meat, back meat and shoulder meat is still connected when it is removed in its entirety from the bone parts of the body of the carcass part 1, for example using the method and device in accordance with the sixth aspect of the invention.

The sixth aspect of the invention relates to processing of carcass parts which comprise at least part of the ribs, part of the meat which is naturally present thereon and part of at least one of the wings.

In the sixth aspect of the invention too, the carcass part 1 which is to be processed is applied and fixed to a product carrier 2 of the type described above.

The carcass part 1 is moved into a position in which its longitudinal axis is located substantially vertically and substantially perpendicular to the conveying direction of the product carrier 2, and the wings or wing parts 91 which are present are hanging downwards, substantially in the direction of the longitudinal axis of the carcass part 1, as shown in FIG. 20. In this position, the carcass part 1 is fed to a device in accordance with the sixth aspect of the invention.

As they enter the device, the hanging wings or wing parts 91 are introduced between horizontal wing guides 81 which extend substantially in the conveying direction of the product carrier 2.

The wings or wing parts 91 are then retained by projections 82, while the product carrier 2 conveys the bone parts of the body of the carcass part 1 onwards. The projections 82 at the same time make a preliminary incision at the start of the wing, in such a manner that the wings or wing parts 91 which are present remain connected to the meat which is present on the carcass part 1.

On account of the fact that the projections 82 are retaining the wings or wing parts 91 and the product carrier 2 is conveying the bone parts of the body of the carcass part 1 onwards in the conveying direction T, the distance between the wings or wing parts 91 which are present and the bone parts of the body of the carcass part 1 are increased. The product carrier 2 is also rotated, in such a manner that the said distance is increased further.

The increase in the said distance causes a force to be exerted on the wings or wing parts 91. As a result, the fillet 90, which comprises breast meat, back meat, shoulder meat and possibly eye meat, and the wings or wing parts 91 which are present are together pulled off the bone parts of the body of the carcass. The inner fillets ("second fillets") remain behind on the bone parts of the body of the carcass part 1, in a state which is such that they can easily be harvested by hand or automatically.

A driver 83 conveys the torn-off assembly comprising the fillet 90 and the wings or wing parts 91 which are present downwards towards separation means 84 which are arranged below the level at which the processing of the carcass parts in the device in accordance with the sixth aspect of the invention begins (denoted by X in FIG. 20).

The separation means 84 separate the wings or wing parts 91 which are present from the fillets 90, after which wings or wing parts 91 and fillets 90 are discharged from the device by a discharge belt 85.

The devices according to the various aspects of the invention are preferably arranged along the path along which the product carriers move. It is not necessary for all the devices described to be used in combination. It is also possible to provide a feature which allows one or more processing devices to be bypassed.

It is possible for the devices described to be designed as stand-alone machines, i.e. not combined with an overhead conveyor or other type of conveyor which guides the carcass parts past various processing devices.

It is not necessary for the product carrier to be able to pivot in a plurality of planes with respect to the path for all the processing operations described. It is sometimes sufficient for the product carrier to be able to pivot in one plane, or it may even be possible to use a rigid product carrier.

There is provision for a processing device which divides the carcass parts through the middle in the longitudinal direction (i.e. substantially in the direction of the backbone and/or breastbone) to be incorporated along the path covered by the carcass parts. It is also possible for the processing devices as described above to carry out the processing operations on halved carcass parts which have been created in this way. It is also possible for the processing devices to be completely designed to process halved carcass parts of this type and therefore to carry out the processing operations on only one side of the product carrier.

There is provision for a processing device which removes any residues of the neck skin and/or the crop fat to be incorporated along the path covered by the carcass parts. A device of this type is shown in FIG. 22.

There is provision for a processing device which cuts off parts of the carcass part 1 (such as for example back pieces intended for soup packets) to be incorporated along the path covered by the carcass parts. The shape of the product carrier 2 is preferably adjusted accordingly, so that the blades which cut off the part of the carcass part 1 cannot cause any damage to the product carrier 2. A device of this type is shown in FIG. 26.

There is provision for a processing device which harvests the second fillets which have remained on the bone parts of the body of the carcass part 1 after it has moved past the device in accordance with the sixth aspect to be incorporated along the path covered by the carcass part. This is preferably carried out in the manner described in EP 0 695 506 and shown in FIGS. 23, 24 and 25. This method involves cutting loose the second fillets and the associated pellicle, slitting them along the breastbone and peeling off the second fillets (cf. FIG. 23, steps I, II and III, respectively). The second fillets can then be harvested by hand (cf. FIG. 24) or automatically (cf. FIG. 25). Manual harvesting has the advantage that during harvesting a final inspection for any meat remaining on the carcass part 1 can take place.

It is preferable for the product carrier 2 to be advanced along its path by a chain conveyor, with the product carrier 2 always located beneath the chain conveyor.

It is preferable for the product carrier 2 to be pivoted into the optimum orientation with respect to the device which is used to carry out each individual processing step.

The invention pertains in a second aspect to a method for processing a carcass part of slaughtered poultry, which carcass part comprises at least part of a rib cage, meat which is naturally present on said rib cage, a neck opening and part of the wishbone, which method comprises the following steps:
  applying and fixing the carcass part to a product carrier, which product carrier is moveable along a path and which product carrier engages on the inside of the carcass part,
  moving a block into the carcass part through the neck opening of the carcass part, which block has a recess for receiving the wishbone or that part of it which is present, and which block is arranged between the two limbs of the wishbone or between the locations at which these limbs would be located if the entire wishbone were present,
  cutting the wishbone or that part of it which is present loose from the carcass part on the side facing the back side of the carcass part by introducing a first wishbone blade along one side of the block, the first wishbone blade having a cutting edge, the contour of which substantially corresponds to the outer contour of the complete wishbone,
  introducing two second wishbone blades into the carcass part on either side along the block, preferably substantially perpendicular to the first wishbone blade, the second wishbone blades substantially following the outer contour of the complete wishbone, and cutting the wishbone or that part of it which is present loose from the carcass part, in such a manner that the wishbone or that part of it which is present is enclosed between the block, the first wishbone blade and the second wishbone blades,
  pulling the block, the first wishbone blade and the second wishbone blades back out of the carcass path together, in such a manner that the wishbone or that part of it which is present remains enclosed between the block, the first wishbone blade and the second wishbone blades and is thereby removed from the carcass part.

Preferably, the method according to the second aspect of the invention is further characterized in that a first wishbone blade which is provided with wing-joint positioning surfaces is used.

Preferably, the method according to the second aspect of the invention is further characterized in that a first wishbone blade which at least in part is wider than the outer contour of the complete wishbone is used.

Preferably, the method according to the second aspect of the invention is further characterized in that a first wishbone blade which is designed to cut all the way to the immediate vicinity of the wing surface is used.

Preferably, the method according to the second aspect of the invention is further characterized in that after the wishbone or that part of it which is present has been removed from the carcass part, compressed air is used to remove the wishbone or that part of it which is present from the block.

Preferably, the method according to the second aspect of the invention is further characterized in that the neck opening is cleared before the first wishbone blade is introduced, or more generally, that the neck opening is cleared before performing an operation on the wishbone or a part thereof which is present. Under "clearing of the neck opening" a removal of skin and/or crop fat and/or other tissue is to be understood.

The second aspect of the invention pertains also to a device for processing a carcass part of slaughtered poultry, which carcass part comprises at least part of a rib cage, meat which is naturally present on said rib cage, a neck opening and part of the wishbone, the carcass part having an interior, which device comprises:
  a product carrier for supporting and retaining the carcass part, which product carrier is designed to move along a path and is preferably pivotable in a plurality of planes with respect to this path, which product carrier is adapted to engage the interior of the carcass part,
  a block which is designed to be moved through the neck opening into the carcass part until it is located between the two limbs of the wishbone or between the locations at which these limbs would be located if the entire wishbone were present, which block has a recess for receiving the wishbone or that part of the wishbone which is present, characterized in that the device also comprises:

a first wishbone blade, which has a cutting edge whose contour substantially corresponds to the outer contour of the complete wishbone for cutting the wishbone or that part of the wishbone which is present loose from the carcass part on the side facing the back side of the carcass part, which first wishbone blade is designed to be introduced into the carcass part along one side of the block, at least two second wishbone blades, which are designed to be introduced into the carcass part along either side of the block, preferably substantially perpendicular to the first wishbone blade, the second wishbone blades substantially following the outer contour of the complete wishbone, and being designed to cut the wishbone or that part of the wishbone which is present loose from the carcass part, in such a manner that the wishbone or that part of the wishbone which is present is enclosed between the block, the first wishbone blade and the second wishbone blades, and characterized in that the device is designed to pull the block, the first wishbone blade and the second wishbone blades out of the carcass part together, in such a manner that the wishbone or that part of the wishbone which is present remains enclosed between the block, the first wishbone blade and the second wishbone blades, so that the wishbone or that part of the wishbone that is present is removed from the carcass part together with the block, the first wishbone blade and the second wishbone blades.

Preferably, the device according to the second aspect of the invention is further characterized in that the first wishbone blade comprises wing-joint positioning surfaces.

Preferably, the device according to the second aspect of the invention is further characterized in that the first wishbone blade is at least in part wider than the outer contour of the complete wishbone.

Preferably, the device according to the second aspect of the invention is further characterized in that the first wishbone blade is designed to cut as far as the immediate vicinity of the wing surface.

Preferably, the device according to the second aspect of the invention is further characterized in that the device comprises compressed-air means for removing the wishbone or that part of the wishbone which is present from the block.

Preferably, the device according to the second aspect of the invention is further characterized in that the device comprises means for clearing the neck opening before the first wishbone blade is introduced, or more generally, means for clearing the neck opening before performing an operation on the wishbone or a part thereof which is present. Under "clearing of the neck opening" a removal of skin and/or crop fat and/or other tissue is to be understood.

Preferably, the device according to the second aspect of the invention is further characterized in that the device is accommodated in a turret machine.

The second aspect of the invention also pertains to a block which is suitable for use in a device according to the second aspect of the invention.

In a third aspect, the invention pertains to a method for processing a carcass part of slaughtered poultry, which carcass part comprises at least part of a rib cage, meat which is naturally present on said rib cage and part of the skin, the carcass part having an interior, which method comprises the following steps:

applying and fixing the carcass part to a product carrier, which product carrier is moveable along a path and is preferably pivotable in a plurality of planes with respect to this path, and which product carrier is adapted to engage the interior of the carcass part, positioning the carcass part with respect to a first processing unit, removing the skin by moving the carcass part past at least two pairs of interacting, resiliently mounted skinning rolls, that part of the carcass part which is to be skinned being pressed onto the skinning rolls, in such a manner that the skinning rolls grip the skin which is to be removed and pull it off the carcass part, the positioning of the skinning rolls with respect to one another being matched to the contour of the carcass part.

Preferably, the method according to the third aspect of the invention is further characterized in that both back skin and breast skin is present on the carcass part, and in that the breast skin is removed before the back skin is removed.

While processing a carcass part as such, mounted on any suitable carrier, on which carcass part both back skin and breast skin is present, a removal of the breast skin before a removal of the back skin is advantageously performed with skinning rolls, or a combination of scraping means and rolls, the rolls being oriented parallel to the longitudinal direction of the breastbone, or at right angles thereto.

i. The third aspect also pertains to a device for processing a carcass part of slaughtered poultry, which carcass part comprises at least part of a rib cage, meat which is naturally present on said rib cage and part of the skin, the carcass part having an interior which device comprises:

a product carrier for supporting and retaining the carcass part, which product carrier is designed to move along a path and is preferably pivotable in a plurality of planes with respect to this path, and which product carrier is adapted to engage the interior of the carcass part, and the product carrier being designed to accurately position the carcass part, at least two pairs of interacting skinning rolls, for gripping the skin which is to be removed and pulling it off the carcass part, when a part of the carcass part which is to be skinned is pressed onto the skinning rolls as the carcass part located on the product carrier moves past, characterized in that the skinning rolls are arranged resiliently, and in that the positioning of the skinning rolls with respect to one another is matched to the expected contour of the carcass part.

Preferably, the device according to the third aspect is adapted to remove the breast skin before removing the back skin. The removal of skin is advantageously performed with skinning rolls, or a combination of scraping means and rolls, the rolls being oriented parallel to the longitudinal direction of the breastbone, or at right angles thereto.

In a fourth aspect, the invention pertains to a method for processing a carcass part of slaughtered poultry, which carcass part comprises at least part of a rib cage, part of the meat which is naturally present on said rib cage, part of at least one of the wings and part of the back skin, the breast skin and the wing skin, the carcass having an interior which method comprises the following steps:

applying and fixing the carcass part to a product carrier, which product carrier is moveable along a path in a conveying direction and is preferably pivotable in a plurality of planes with respect to this path, and which product carrier is preferably adapted to engage the interior of the carcass part, positioning the carcass part with respect to a first processing unit, making a first incision in the skin in the region of the connection between body and wing, on the breast side, in such a manner that the first incision on any carcass part is located at virtually the same position on the carcass part, irrespective of the size of the product, removing the breast skin by moving the carcass part past at least one pair of interacting skinning rolls, in such a manner that the skinning rolls grip the breast skin and pull it off the carcass part, the breast skin tearing off at the first incision which was made in the skin, with the result that the back skin and the wing skin remain connected to the carcass part, positioning the carcass part with respect to a second processing unit, with the carcass part located in a first orientation with respect to the conveying direction, cutting into the skin in the region of the connection between body and wing, on the side of the back, with the carcass part, during the cutting operation, being moved from the first orientation into a second orientation with respect to the conveying direction, so that a curved second incision is formed, removing the back skin by moving the carcass part past at least one pair of interacting skinning rolls, in such a manner that the skinning rolls grip the back skin and pull it off the carcass part, the back skin tearing off at the second incision between body and wing, with the result that a predetermined part of the wing skin remains connected to the carcass part.

In the method according to the fourth aspect of the invention, it not necessary to use a product carrier that engages the interior of the carcass part. It is also envisaged that carriers are used that engage the outside of the carcass part.

Preferably, the method according to the fourth aspect of the invention is further characterized in that in the first orientation the longitudinal axis of the carcass part is directed substantially vertically and perpendicular to the conveying direction, with its back side facing in the downstream direction.

Preferably, the method according to the fourth aspect of the invention is further characterized in that in the second orientation the longitudinal axis of the carcass part is positioned substantially horizontally, parallel to the conveying direction, and the neck opening of the carcass part faces upstream.

Preferably, the method according to the fourth aspect of the invention is further characterized in that the depth of the first and second incisions is selected in such a manner that the meat beneath the skin remains intact when the skin is being cut into.

Preferably, the method according to the fourth aspect of the invention is further characterized in that before the first incision is made the breast meat is pressed away from the location in the carcass part where the first incision is made.

The fourth aspect also pertains to a device for processing a carcass part of slaughtered poultry, which carcass part comprises at least part of a rib cage, meat which is naturally present on said rib cage, part of at least one of the wings and part of the back skin, the breast skin and the wing skin, the carcass part having an interior which device comprises:

a product carrier for supporting and retaining the carcass part, which product carrier is designed to move along a path and is preferably pivotable in a plurality of planes with respect to this path, and which product carrier is preferably adapted to engage the interior of the carcass part, and the product carrier being designed to accurately position the carcass part, first cutting means for making a first incision in the skin in the region of the connection between body and wing, on the side of the breast, at least one first pair of interacting skinning rolls, such that the skinning rolls as the carcass part located on the product carrier moves past, grip the breast skin and pull it off the carcass part, with the breast skin tearing off at the first incision which has been made in the skin, with the result that the back skin and the wing skin remain connected to the carcass part, second cutting means for making a second incision in the skin in the region of the connection between body and wing, on the side of the back, at least one second pair of interacting skinning rolls, in such a manner that the skinning rolls, as the carcass part located on the product carrier moves past, grip the back skin and pull it off the carcass part, with the back skin tearing off at the second incision which has been made in the skin, with the result that a predetermined part of the wing skin remains present on the one or more wings or wing parts which are present, characterized in that the product carrier and the first cutting means are adapted to interact in such a manner that the first incision is located at approximately the same position on the carcass part of each product, irrespective of the size of the product, and in that the product carrier and the second cutting means are adapted to interact in such a manner that the second incision is located at approximately the same position on the carcass part of each product, irrespective of the size of the product, the product carrier, as the second cutting means move past, executing a movement which is such that an accurately shaped, curved second incision is formed.

Preferably, the device according to the fourth aspect of the invention is further characterized in that the cutting depth of the first and/or second cutting means can be adjusted in such a manner that the meat beneath the skin remains intact when the skin is being cut into. Preferably, this is achieved by mounting a retaining device adjacent to the cutting means that prevents the cutting means from cutting to deep in the carcass part. In case of a the cutting means being a rotating knife, the retaining device is preferably a disc. This disc has on its side facing the rotating knife a diameter which is somewhat smaller than the diameter of the rotating knife. Further away from the rotating knife, the diameter of the disc is preferably the same as the diameter of the rotating knife.

Preferably, the device according to the fourth aspect of the invention is further characterized in that the device comprises means for pushing the breast meat away from the location in the carcass part where the first incision is made before this first incision is made.

In a fifth aspect, the invention pertains to a method for processing a carcass part of slaughtered poultry, which carcass part comprises at least part of a rib cage, meat which is naturally present on said rib cage on both the breast side and the back side, the carcass part having an interior which method comprises the following steps:

applying and fixing the carcass part to a product carrier, which product carrier is moveable along a path and is preferably pivotable in a plurality of planes with respect to this path, and which product carrier engages the interior of the carcass part, making two incisions in the meat on the back side of the carcass part, which incisions extend on either side of the backbone or the location in the carcass part where the backbone was located before being removed, and run substantially parallel thereto, loosening the back and shoulder meat from the bone parts of the body of the carcass part, in such a manner that a connection between the back and shoulder meat, on the one hand, and the breast meat—which is still connected to the bone parts of the body of the carcass part—on the other hand continues to exist, the back and shoulder meat being removed by the use of scraper means which initiate scraping from the incisions which have already been made on either side of the backbone, removing the breast meat from the bone parts of the body of the carcass part, in such a manner the breast, back and shoulder meat is all still joined together when it is removed in its entirety from the bone parts of the body of the carcass part.

Preferably, the method according to the fifth aspect of the invention is further characterized in that the scraper means are arranged resiliently.

Preferably, the method according to the fifth aspect of the invention is further characterized in that the incisions along the backbone are made using rotating blades.

Preferably, the method according to the fifth aspect of the invention is further, characterized in that after the back and shoulder meat has been removed from the bone parts of the body of the carcass part, an incision is made beneath the shoulder blade, so that substantially all the meat located on the ribs is harvested.

The fifth aspect also pertains to a device for processing a carcass part of slaughtered poultry, which carcass part comprises at least part of a rib cage, meat which is naturally present on said rib cage on both the breast side and the back side, the carcass part having an interior which device comprises:

a product carrier for supporting and retaining the carcass part, which product carrier is designed to move along a path and is preferably pivotable in a plurality of planes with respect to this path, and which product carrier is adapted to engage the interior of the carcass part, and the product carrier being designed to position the carcass part, cutting means for making two incisions in the meat on the back side of the carcass part, these incisions extending on either side of the backbone or the location in the carcass part where the backbone was located before it was removed, and run substantially parallel thereto, scraper means for removing the back and shoulder meat from the bone parts of the body of the carcass part, which initiate the scraping-off of the back and shoulder meat from the incisions which have already been made on either side of the backbone, means for removing the breast meat from the bone parts of the body of the carcass part, characterized in that the scraper means are designed in such a manner that during the removal of the back and shoulder meat from the bone parts of the body of the carcass part a connection remains between the back and shoulder meat, on the one hand, and the breast meat—which is still connected to the bone parts of the body of the carcass part—on the other hand, and in that the means for removing the breast meat from the bone parts of the body of the carcass part are designed in such a manner that the breast, back and shoulder meat is still connected when it is removed in its entirety from the bone parts of the body of the carcass part.

Preferably, the device according to the fifth aspect of the invention is further characterized in that the scraper means are arranged resiliently.

Preferably, the device according to the fifth aspect of the invention is further, characterized in that the cutting means are rotating blades.

Preferably, the device according to the fifth aspect of the invention is further, characterized in that after the back and shoulder meat has been removed from the bone parts of the body of the carcass part, an incision is made beneath the shoulder blade, so that substantially all the meat on the ribs is harvested.

In a sixth aspect the invention pertains to a method for processing a carcass part of slaughtered poultry, which carcass part comprises at least part of a rib cage, part of the meat which is naturally present on said rib cage and part of at least one of the wings, the carcass part having an interior which method comprises the following steps:

applying and fixing the carcass part to a product carrier, which product carrier is moveable along a path and is preferably pivotable in a plurality of planes with respect to this path, and which product carrier is adapted to engage the interior of the carcass part, positioning the carcass part in such a manner that the longitudinal axis of the carcass part is located substantially vertically and substantially perpendicular to the conveying direction of the product carrier, and the wings or wing parts which are present hang downwards, substantially in the direction of the longitudinal axis of the carcass part, introducing the hanging wings or wing parts between horizontal guides, which extend substantially in the conveying direction of the product carriers, retaining the wings or wing parts which are present while the product carrier conveys the bone parts of the body of the carcass part onwards, with a first incision being made at the same time at the start of the wings, in such a manner that the wings or wing parts which are present remain connected to the breast meat which is present on the carcass part, increasing the distance between the wings or wing parts which are present and the bone parts of the body of the carcass part by exerting a force on the wings or wing parts which are present, in such a manner that the fillet, which comprises breast meat, back meat, shoulder meat and possibly eye meat, and the wings or wing parts which are present are together pulled off the bone parts of the body of the carcass, conveying the set comprising fillet and the wings or wing parts which are present in the downwards direction, separating the fillets and the wings or wing parts which are present at a location below the level at which the processing of the products begins, discharging fillets and wings, at a location below the level at which the processing of the products begins.

The sixth aspect also pertains to a device for processing a carcass part of slaughtered poultry, which carcass part comprises at least part of a rib cage, part of the meat which is naturally present on said rib cage and part of at least one of the wings, the carcass part having an interior which device comprises:

a product carrier for supporting and retaining the carcass part, which product carrier is designed to move along a path and is preferably pivotable in a plurality of planes with respect to this part, and which product carrier is adapted to engage the interior of the carcass part, substantially horizontal guides which extend substantially in the conveying direction of the product carriers, for the purpose of guiding the wings or wing parts which are present, a retaining means for retaining the wings or wing parts which are present while the product carrier conveys the bone parts of the body of the carcass part onwards, first cutting means which, at the same time as the wings or wing parts are being retained, make a first incision at the start of the wing, in such a manner that the wings or wing parts which are present remain connected to the breast meat which is present on the carcass part, a driver for increasing the distance between the wings or wing parts which are present and the bone parts of the body of the carcass part by exerting a force on the wings or wing parts which are present, in such a manner that the fillet, which comprises breast meat, back meat, shoulder meat and possibly eye meat, and the wings or wing parts which are present are together pulled off the bone parts of the body of the carcass, and for conveying the assembly comprising fillet and the wings or wing parts which are present, separation means for separating the fillets and the wings or wing parts which are present from one another, discharge means for discharging the fillets and the wings or wing parts from the device, characterized in that the product carrier, during introduction, is adapted to position the carcass part in such a manner that the longitudinal axis of the carcass part is located substantially vertically and substantially perpendicular to the conveying direction of the product carrier, and the wings or wing parts which are present hang downwards, substantially in the direction of the longitudinal axis of the carcass part, and in that both the separation means and the discharge means are located at a lower level than the level at which the product carrier is located as it moves in.

Any previously described method is preferably further characterized in that after the carcass part has been applied and fixed to the product carrier, the wing parts which are present are stretched.

Any previously described method is preferably further characterized in that any residues of the neck skin and/or the crop fat are removed.

Any previously described method is preferably further characterized in that the product carrier is advanced along its path by a chain conveyor, with the product carrier always located beneath the chain conveyor.

Any previously described method is preferably further characterized in that the product carrier is pivoted into the optimum orientation for each processing step with respect to the device with which the processing step is carried out.

The invention claimed is:

1. A device for processing a carcass part of slaughtered poultry, wherein the carcass part comprises at least part of a rib cage, meat which is naturally present on the rib cage and skin, and wherein the carcass part has an interior, the device comprising:

a product carrier for supporting and retaining the carcass part, wherein the product carrier is designed to move along a path and wherein the product carrier is adapted to engage the interior of the carcass part; and at least a first pair and a second pair of interacting skinning rolls adapted to grip the skin which is to be removed and pull it off the carcass part, wherein at least one roll of the first pair is separated from at least one roll of the second pair by a distance and wherein the at least one roll of the first pair is adapted to move relative to the at least one roll of the second pair to vary the distance.

2. The device of claim 1, wherein the carcass part further comprises back skin and breast skin and wherein the device is adapted to remove the breast skin before removing the back skin.

3. The device of claim 1, wherein the carcass part further comprises a breastbone with a longitudinal axis, and wherein the removal of skin is performed with the interacting skinning rolls, or a combination of scraping means and the rolls, wherein the rolls are oriented parallel to the longitudinal axis of the breastbone or at right angles to the longitudinal axis of the breastbone.

4. The device of claim 1, wherein the product carrier is pivotable in a plurality of planes.

5. A device for processing a carcass part of slaughtered poultry, wherein the carcass part comprises at least part of a rib cage, meat which is naturally present on the rib cage, part of at least one of the wings and part of the back skin, the breast skin and the wing skin, and wherein the carcass part has an interior, the device comprising:

a product carrier for supporting and retaining the carcass pan in an orientation, wherein the product carrier is adapted to move along a path and wherein the product carrier is adapted to engage the interior of the carcass part; and a plurality of processing stations, wherein the plurality of processing stations comprises:

a first cutting station comprising first cutting means for making a first incision in the skin, wherein the first incision is located on the side of the carcass part including the breast in the region of the connection of the wing to the carcass part;

a first skinning station positioned along the path after the first cutting station and comprising a first pair of interacting skinning rolls, adapted to grip the breast skin and pull it off the carcass part, wherein the breast skin tears off at the first incision which has been made in the skin, and wherein the back skin and the wing skin remain connected to the carcass part;

a second cutting station positioned along the path after the first skinning station and comprising second cutting means for making a second incision in the skin and means for altering the orientation between the carcass part and second cutting means during making of the second incision, wherein the second incision is located on the side of the carcass part including the back in the region of the connection of the wing to the carcass part;

a second skinning station positioned along the path after the second cutting station and comprising a second pair of interacting skinning rolls, adapted to grip the back skin and pull it off the carcass part, wherein the back skin tears off at the second incision which has been made in the skin, and wherein a predetermined part of the wing skin remains present, wherein the first and second incisions are located at approximately the same position on each carcass part, irrespective of the size of the carcass part.

6. The device of claim 5, wherein the first or second cutting means or both are adjustable.

7. The device of claim 6, wherein the meat beneath the skin remains intact after the first and second incisions are made.

8. The device of claim 6, further comprising a retaining device adapted to prevent at least one of the first and second cutting means from cutting too deep in the carcass part.

9. The device of claim 8, wherein the retaining device is mounted adjacent to the at least one of the first and second cutting means.

10. The device of claim 5, wherein at least one of the first and second cutting means comprises a rotating knife, and wherein the retaining device comprises a disc.

11. The device of claim 5, wherein the device further comprises means for pushing the meat away from the location of the first incision before the first incision is made.

12. The device of claim 5, wherein the product carrier is pivotable in a plurality of planes.

13. A device for processing a carcass part of slaughtered poultry, wherein the carcass part comprises at least part of a rib cage, meat which is naturally present on the rib cage and skin, wherein the carcass part has an interior, the device comprising:

a. a product carrier for supporting and retaining the carcass part, wherein the product carrier is designed to move along a path and wherein the product carrier is adapted to engage the interior of the carcass part; and b. at least two pairs of interacting skinning rolls adapted to grip the skin which is to be removed and pull it off the carcass part, wherein the rolls are positioned in a substantially v-shaped orientation and each pair of rolls is adapted to pivot about a pivot point so as to be resilient.

14. The device of claim 13, wherein the carcass part further comprises back skin and breast skin and wherein the device is adapted to remove the breast skin before removing the back skin.

15. The device of claim 13, wherein the carcass part further comprises a breastbone with a longitudinal axis, and wherein the removal of skin is performed with the interacting skinning rolls, or a combination of scraping means and the rolls, wherein the rolls are oriented parallel to the longitudinal axis of the breastbone or at right angles to the longitudinal axis of the breastbone.

16. The device of claim 13, wherein the product carrier is pivotable in a plurality of planes.

* * * * *

UNITED STATES PATENT AND TRADEMARK OFFICE
Certificate

Patent No. 7,232,366 B2                                                                                                             Patented: June 19, 2007

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Adrianus Josephes Van Den Nieuwelaar, Gemert (NL); Gerardus Johannes Catharina van Bussel, Neerkant (NL); and Petrus Christianus, Wilbertoord (NL).

Signed and Sealed this Twenty-first Day of October 2008.

*PETER M. POON*
*Supervisory Patent Examiner*
Art Unit 3643

UNITED STATES PATENT AND TRADEMARK OFFICE
Certificate

Patent No. 7,232,366 B2                                              Patented: June 19, 2007

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Adrianus Josephes Van Den Nieuwelaar, Gemert (NL); Gerardus Johannes Catharina van Bussel, Neerkant (NL); and Petrus Christianus Hendrikus Janssen, Wilbertoord (NL).

Signed and Sealed this Fifth day of May 2009.

PETER M. POON
*Supervisory Patent Examiner*
Art Unit 3643